: US009753213B2

United States Patent
Nishitani et al.

(10) Patent No.: US 9,753,213 B2
(45) Date of Patent: Sep. 5, 2017

(54) PLANAR LIGHT SOURCE DEVICE AND LIQUID CRYSTAL DISPLAY APPARATUS

(71) Applicant: MITSUBISHI ELECTRIC CORPORATION, Tokyo (JP)

(72) Inventors: Rena Nishitani, Tokyo (JP); Nami Nakano, Tokyo (JP); Tomohiro Sasagawa, Tokyo (JP); Nobutaka Kobayashi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 224 days.

(21) Appl. No.: 14/418,850

(22) PCT Filed: Jul. 24, 2013

(86) PCT No.: PCT/JP2013/004493
§ 371 (c)(1),
(2) Date: Jan. 30, 2015

(87) PCT Pub. No.: WO2014/020864
PCT Pub. Date: Feb. 6, 2014

(65) Prior Publication Data
US 2015/0301269 A1  Oct. 22, 2015

(30) Foreign Application Priority Data

Jul. 31, 2012 (JP) .................. 2012-169276

(51) Int. Cl.
*F21V 8/00* (2006.01)
*G02F 1/1335* (2006.01)

(52) U.S. Cl.
CPC ......... *G02B 6/0068* (2013.01); *G02B 6/0031* (2013.01); *G02B 6/0073* (2013.01);
(Continued)

(58) Field of Classification Search
CPC .................................. G02B 6/0096
See application file for complete search history.

(56) References Cited

U.S. PATENT DOCUMENTS

2005/0024845 A1  2/2005 Mori et al.
2005/0269560 A1  12/2005 Oku
(Continued)

FOREIGN PATENT DOCUMENTS

CN  1797115 A  7/2006
CN  101495801 A  7/2009
(Continued)

*Primary Examiner* — Dennis Y Kim
(74) *Attorney, Agent, or Firm* — Birch, Stewart, Kolasch & Birch, LLP

(57) ABSTRACT

A planar light source device 200 includes a light source 10 and a reflection member 30. The light source 10 emits a light beam 10a having directivity. The reflection member 30 has a box shape including a single bottom-plate part 30e, side-plate parts 30a, 30b, 30c and 30d connected to the bottom-plate part 30e, and an opening part 30f facing the bottom-plate part 30e. The box shape has inner surfaces which are reflection surfaces. The bottom-plate part 30e has a quadri-lateral shape including two facing short sides and two facing long sides. The light beam 10a enters an inside of the box shape of the reflection member 30 through a side of the side-plate part 30a connected to the short side of the bottom-plate part 30e, travels in a direction of the long side of the bottom-plate part 30e while being reflected at the side-plate parts 30c and 30d connected to the long sides of the bottom-plate part 30e, and is emitted through the opening part 30f. The reflection surfaces of the side-plate parts 30c and 30d connected to the long sides of the bottom-plate part 30e include regions at which the light beam 10a is specularly reflected and regions at which the light beam 10a is diffused and reflected.

16 Claims, 13 Drawing Sheets

(52) U.S. Cl.
CPC ......... G02B 6/0078 (2013.01); G02B 6/0096 (2013.01); *G02F 1/133615* (2013.01); *G02F 2001/133601* (2013.01)

(56) References Cited

U.S. PATENT DOCUMENTS

| | | | |
|---|---|---|---|
| 2005/0270796 A1 | 12/2005 | Ichikawa et al. | |
| 2006/0139960 A1 | 6/2006 | Sakai et al. | |
| 2006/0232964 A1 | 10/2006 | Hoshi et al. | |
| 2008/0049441 A1* | 2/2008 | Lee | G02B 6/0096 362/561 |
| 2008/0231772 A1* | 9/2008 | Hung | F21V 5/04 349/65 |
| 2009/0128735 A1 | 5/2009 | Larson et al. | |
| 2009/0167990 A1* | 7/2009 | Konno | G02B 6/0078 349/65 |
| 2009/0303744 A1 | 12/2009 | Iwasaki | |
| 2010/0156953 A1* | 6/2010 | Nevitt | G02B 6/0068 345/690 |
| 2010/0165013 A1 | 7/2010 | Yamamoto et al. | |
| 2010/0165621 A1* | 7/2010 | Hoffend, Jr. | G02B 6/0031 362/235 |
| 2010/0271843 A1 | 10/2010 | Holten et al. | |
| 2010/0309407 A1 | 12/2010 | Shimura | |
| 2011/0051047 A1* | 3/2011 | O'Neill | G02B 6/0096 349/67 |
| 2011/0157864 A1 | 6/2011 | Hattori et al. | |
| 2012/0069548 A1 | 3/2012 | Chen et al. | |
| 2014/0254125 A1* | 9/2014 | Nevitt | G02B 6/0055 362/19 |

FOREIGN PATENT DOCUMENTS

| | | |
|---|---|---|
| CN | 201318632 Y | 9/2009 |
| CN | 101726788 A | 6/2010 |
| JP | 3-011502 A | 1/1991 |
| JP | 5-066406 A | 3/1993 |
| JP | 2001-210122 A | 8/2001 |
| JP | 2005-050727 A | 2/2005 |
| JP | 2005-216693 A | 8/2005 |
| JP | 2005-347084 A | 12/2005 |
| JP | 2005-347214 A | 12/2005 |
| JP | 2006-252958 A | 9/2006 |
| JP | 2007-115508 A | 5/2007 |
| JP | 2008-066162 A | 3/2008 |
| JP | 2009-175702 A | 8/2009 |
| JP | 2009-199822 A | 9/2009 |
| JP | 2010-152370 A | 7/2010 |
| JP | 2010-225395 A | 10/2010 |
| JP | 2010-282900 A | 12/2010 |
| JP | 2011-509500 A | 3/2011 |
| JP | 2011-138658 A | 7/2011 |
| JP | 2011-228078 A | 11/2011 |
| JP | 2012-069499 A | 4/2012 |
| TW | 200835976 A | 9/2008 |
| WO | WO 2007/091610 A1 | 8/2007 |
| WO | WO 2009/077979 A1 | 6/2009 |

\* cited by examiner

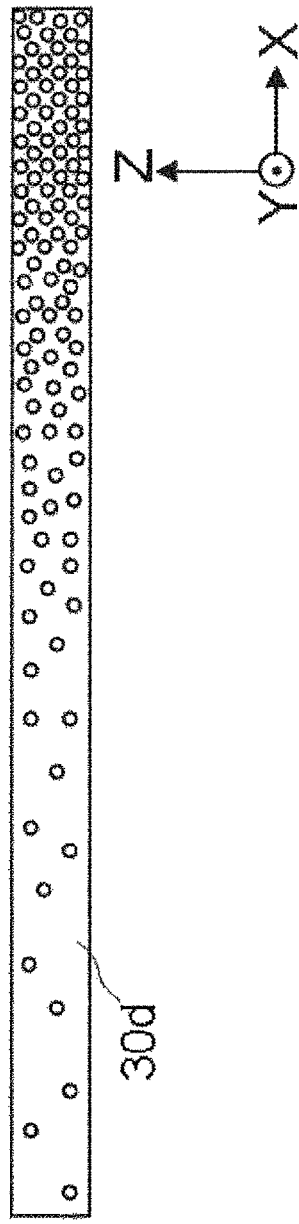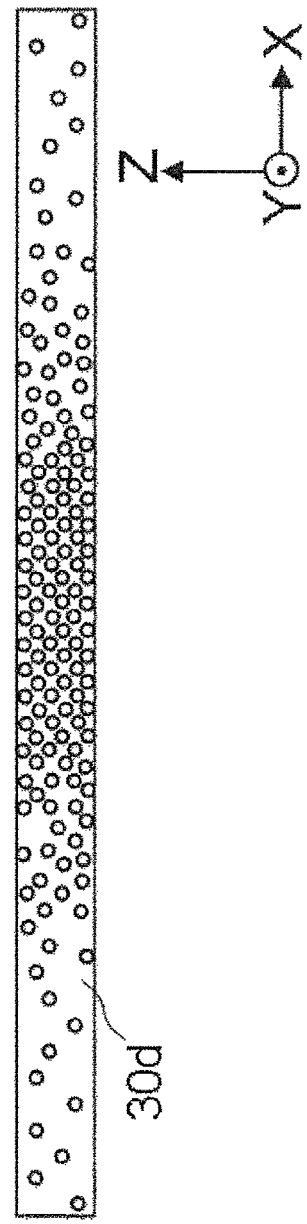

PLANAR LIGHT SOURCE DEVICE AND LIQUID CRYSTAL DISPLAY APPARATUS

TECHNICAL FIELD

The present invention relates to a planar light source device that includes a laser as a light source and produces planar light having a uniform light-intensity distribution from point-like laser light, and a liquid crystal display apparatus.

BACKGROUND ART

A liquid crystal display element included in a liquid crystal display apparatus does not emit light itself. For this reason, the liquid crystal display apparatus includes a planar light source device on a back side of the liquid crystal display element as a light source that illuminates the liquid crystal display element. The liquid crystal display element receives light emitted by a backlight unit, and emits image light. Conventionally, cold cathode fluorescent lamps have been mainly used as light sources of planar light source devices. The cold cathode fluorescent lamp (hereinafter referred to as a CCFL (Cold Cathode Fluorescent)) is a lamp including a glass tube having an inner wall coated with fluorescent substance, and producing white light. However, in recent years, due to drastic improvement in performance of light emitting diodes (hereinafter referred to as LEDs (Light Emitting Diodes)), there is a rapidly growing demand for planar light source devices using LEDs as light sources.

However, light emitted from the CCFL or the LED has poor color purity. Therefore, liquid crystal display apparatuses employing these light sources have a problem that a color-reproduction range is narrow. In this regard, the term "poor color purity" means that light includes a plurality of wavelengths and has low monochromaticity.

Therefore, in recent years, it has been proposed to use a laser with high color purity as a light source of the liquid crystal display apparatus in order to provide the liquid crystal display apparatus having a wide color-reproduction range. Light emitted from the laser has very high monochromaticity. Therefore, a planar light source device using the laser enables providing vivid-color images. In this regard, the term "monochromatic color" means a color having a narrow wavelength width, i.e., a single color with which no other color is mixed. The term "monochromatic light" means single light having a narrow wavelength width.

However, meanwhile, when the laser that emits light having high directivity from a point light source is used as the light source of the planar light source device, it is very difficult to obtain planar light having a spatial light-intensity distribution of high uniformity. The term "point light source" means a light source that radiates light from a single point. Here, the term "single point" means having an area to such an extent that a light source can be treated as a point in an optical calculation without causing any problem in consideration of performance of a product.

A planar light source and a liquid crystal display apparatus described in Patent Document 1 include an optical system including a plurality of optical elements. Light emitted from a laser is shaped by the optical system so that the light has a light intensity distribution in a desired shape. Then, the light emitted from the laser is emitted from the planar light emitting device as planar light having high uniformity.

PRIOR ART DOCUMENT

Patent Document

Patent Document 1: Japanese Patent Application Publication No. 2008-66162

SUMMARY OF THE INVENTION

Problem to be Solved by the Invention

However, the planar light source and the liquid crystal display apparatus described in Patent Document 1 need a plurality of optical elements and a space propagation distance for shaping the light intensity distribution of the laser. The optical elements and the space propagation distance are provided outside an image display unit, and therefore it is necessary to enlarge the liquid crystal display apparatus in size. Recently, there is a demand for downsizing the liquid crystal display apparatus and simplifying a configuration of the liquid crystal display apparatus. If the configuration of Patent Document 1 is applied to the liquid crystal display apparatus, it is difficult to achieve downsizing of the liquid crystal display apparatus and simplification of the configuration of the liquid crystal display apparatus.

The present invention is made in light of the above description, and an object of the present invention is to provide a planar light source device that emits planar light having a spatial light-intensity distribution of high uniformity with a simplified configuration, and to provide a liquid crystal display apparatus.

Means for Solving the Problem

The planar light source device of the present invention includes a first light source that emits a first light beam having directivity, and a reflection member having a box shape including a single bottom-plate part, side-plate parts connected to the bottom-plate part and an opening part facing the bottom-plate part. The box shape having inner surfaces which are reflection surfaces. The bottom-plate part has a quadrilateral shape including two facing short sides and two facing long sides. The first light beam enters an inside of the box shape of the reflection member through a side of the side-plate part connected to the short side of the bottom-plate part, travels in a direction of the long sides of the bottom-plate part while being reflected at the side-plate parts connected to the long sides of the bottom-plate part, and is emitted through the opening part. The reflection surface of the side-plate part connected to the long side of the bottom-plate part includes a region at which the first light beam is specularly reflected and a region at which the first light beam is diffused and reflected.

Effect of the Invention

The present invention makes it possible to provide planar light having a wide color-reproduction range and an in-plane luminance distribution of high uniformity, with a simple configuration.

BRIEF DESCRIPTION OF THE DRAWINGS

FIGS. 4(A) and 4(B) are configuration diagrams schematically illustrating a side surface of the unit according to Embodiment 1 of the present invention.

MODE FOR CARRYING OUT THE INVENTION

Embodiments of a planar light source device and a liquid crystal display apparatus according to the present invention will be described below in detail with reference to drawings. In this regard, the present invention is not limited to the embodiments.

Embodiment 1

Figure 1:
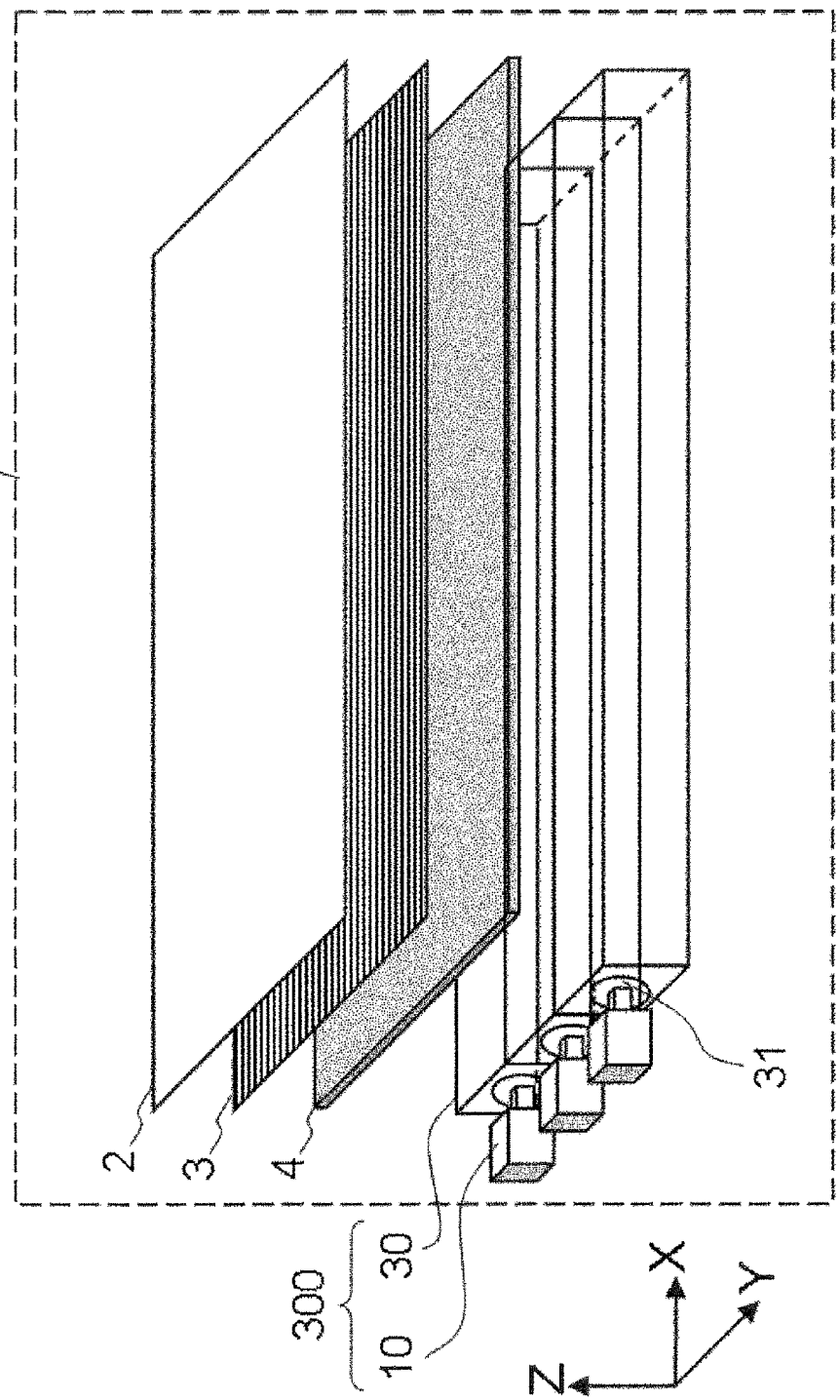
FIG. 1 is a configuration diagram schematically illustrating a configuration of a planar light source device of Embodiment 1 of the present invention.

FIG. 1 is a configuration diagram schematically illustrating a configuration of a planar light source device 200 of Embodiment 1 of the present invention. In the following description, in order to facilitate explanation of the drawings, a direction of short sides of the planar light source device is defined as a Y-axis direction, a direction of long sides is defined as an X-axis direction, and a direction perpendicular to an X-Y plane is defined as a Z-axis direction. A light emission direction from the planar light source device is defined as a positive Z-axis direction. An upward direction when the planar light source device is used is defined as a positive Y-axis direction. When a light emission surface of the planar light source device is viewed from the positive Z-axis direction, and when the positive Y-axis direction is the upward direction, a left side is defined as a positive X-axis direction. A light emission direction of a first light source 10 which will be described later is the positive X-axis direction.

As illustrated in FIG. 1, the planar light source device 200 includes a luminance distribution converting device 300. Further, the planar light source device 200 may include a diffusion plate 4. Further, the planar light source device 200 may include a second optical sheet 3. Further, the planar light source device 200 may include a first optical sheet 2. These elements 2, 3, 4 and 300 are arranged in the Z-axis direction. The first optical sheet 2, the second optical sheet 3, the diffusion plate 4 and the luminance distribution converting device 300 are arranged in this order from the positive Z-axis direction toward a negative Z-axis direction.

Figure 2:
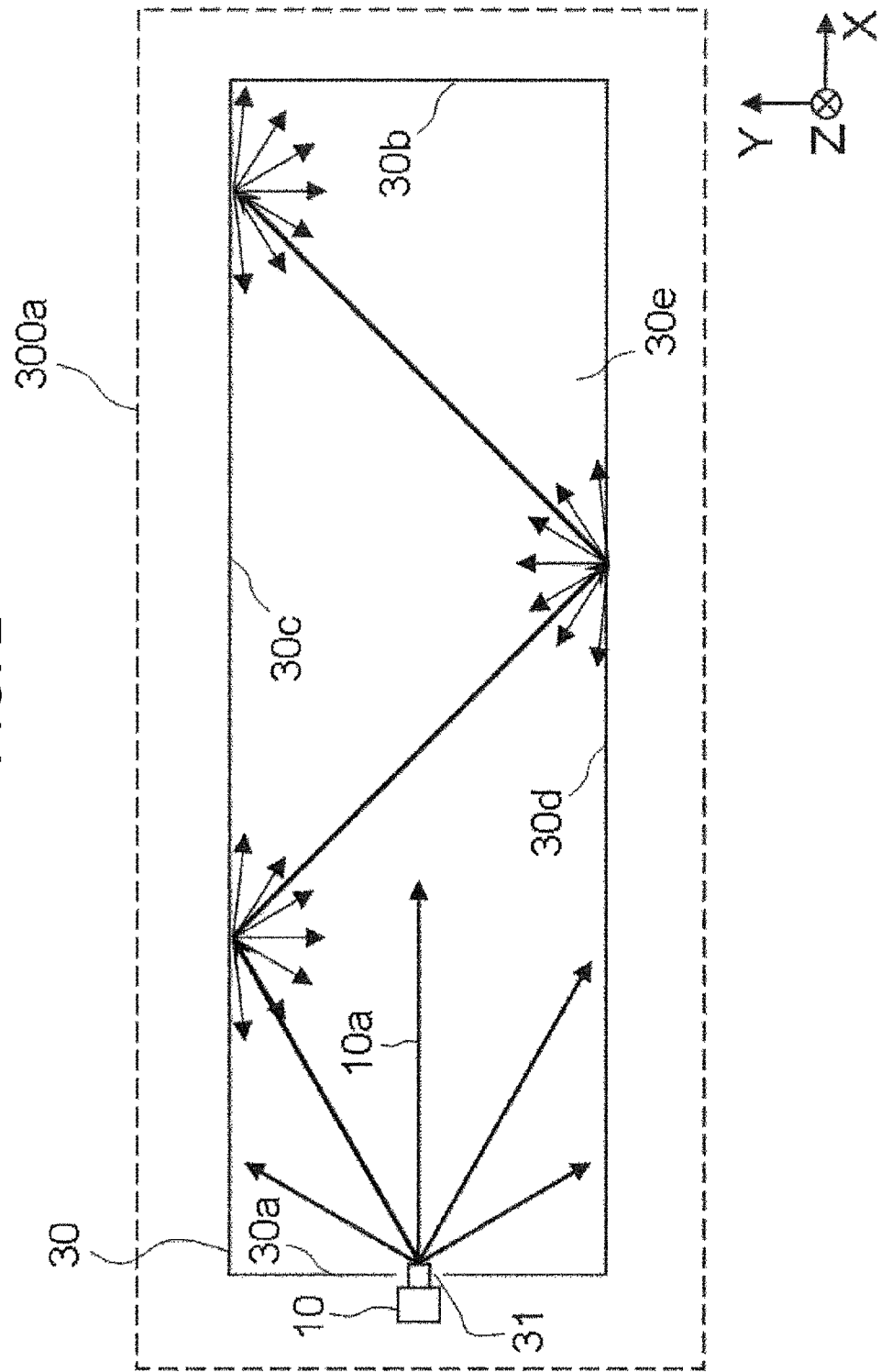
FIG. 2 is a configuration diagram schematically illustrating a configuration of a unit of Embodiment 1 of the present invention.

The luminance distribution converting device 300 includes a plurality of units 300a. FIG. 2 is a configuration diagram schematically illustrating a configuration of the unit 300a. The plurality of units 300a each includes the light source 10 and a reflection member 30. The reflection member 30 has a box shape with an opening part 30f in the positive Z-axis direction. The box shape of the reflection member 30 includes five plate-like parts. In this regard, the term "plate-like" includes a thin sheet-like shape. The five plate-like parts are side-plate parts 30a, 30b, 30c and 30d, and a bottom-plate part 30e.

A single reflection member 30 is provided corresponding to each light source 10. The reflection member 30 has a rectangular shape elongated in the X-axis direction as viewed from the positive Z-axis direction. The reflection member 30 has the bottom-plate part 30e in the negative Z-axis direction, and the bottom-plate part 30e is parallel to the X-Y plane. Further, the reflection member 30 has the side-plate part 30b in the positive X-axis direction, and the side-plate part 30b is parallel to a Y-Z plane. Further, the reflection member 30 has the side-plate part 30c in the positive Y-axis direction, and the side-plate part 30c is parallel to a Z-X plane. Further, the reflection member 30 has the side-plate part 30d in a negative Y-axis direction, and the side-plate part 30d is parallel to the Z-X plane. Further, the reflection member 30 has the side-plate part 30a in a negative X-axis direction, and the side-plate part 30a is parallel to the Y-Z plane. A hole 31 is provided on the side-plate part 30a, and the hole 31 allows light emitted from the light source 10 to pass through.

The side-plate parts 30a, 30b, 30c and 30d and the bottom-plate part 30e of the reflection member 30 have inner surfaces which are reflection surfaces. The term "inner surface" means an inner surface of the box shape of the reflection member 30. In other words, the reflection surfaces are a surface of the bottom-plate part 30e in the positive Z-axis direction, a surface of the side-plate part 30a in the positive X-axis direction, a surface of the side-plate part 30b in the negative X-axis direction, a surface of the side-plate part 30c in the negative Y-axis direction, and a surface of the side-plate part 30d in the positive Y-axis direction. In the reflection member 30, a light free propagation space is formed by the side-plate parts 30a, 30b, 30c and 30d and the bottom-plate part 30e. The term "light free propagation space" means a closed space in which light is allowed to propagate freely. In the luminance distribution converting device 300, the plurality of units 300a are arranged in a plane parallel to the X-Y plane. Each unit 300a is disposed so as to be in contact with adjacent units 300a at the side-plate parts 30c and 30d parallel to the Z-X plane.

Figure 3:
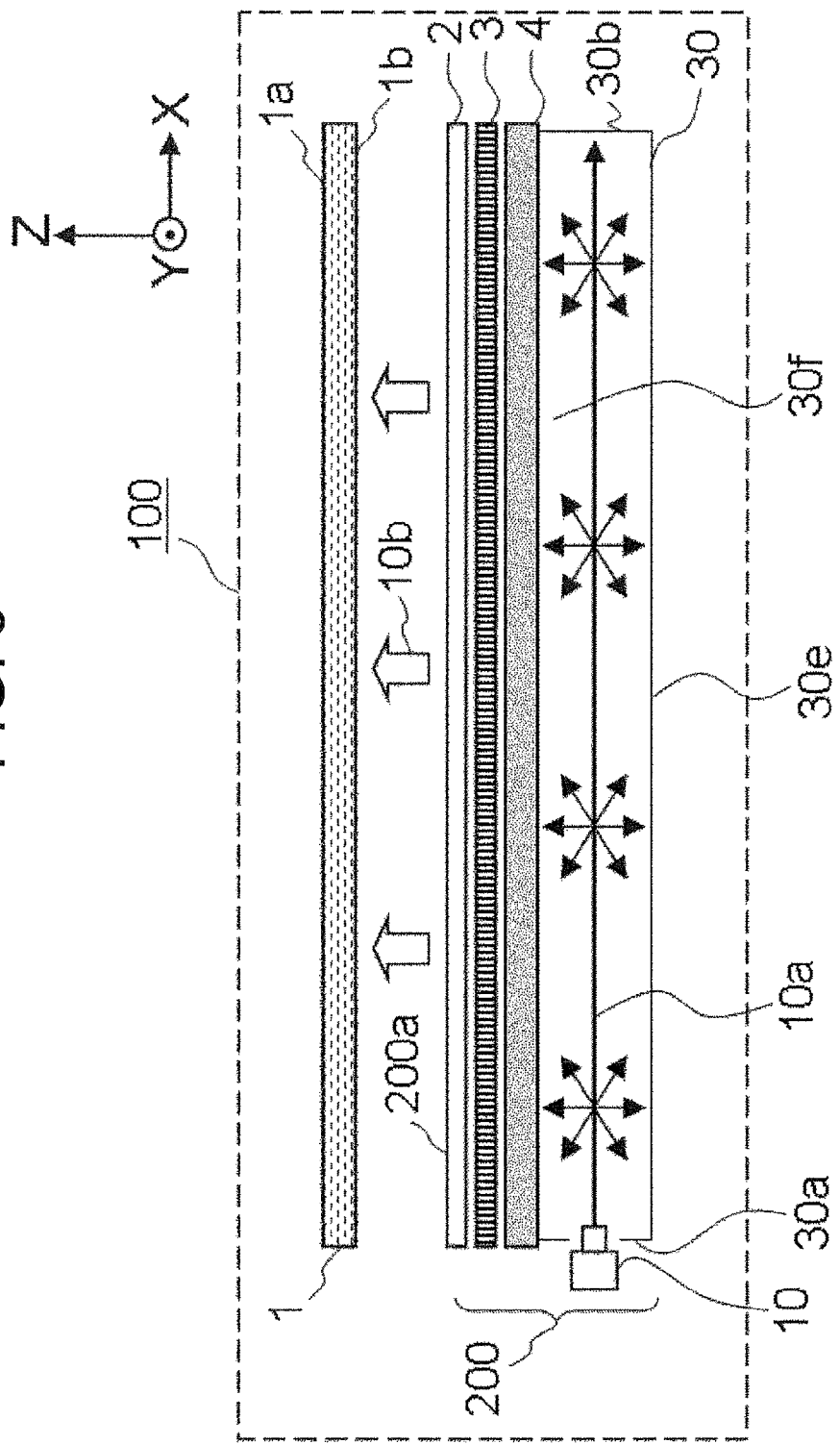
FIG. 3 is a configuration diagram schematically illustrating a configuration of a liquid crystal display apparatus of Embodiment 1 of the present invention.

In this regard, the light source 10 is a first light source. The planar light source device 200 has a light emission surface 200a. In Embodiment 1, as illustrated in FIG. 3, the light emission surface 200a is a surface of the first optical sheet 2 in the positive Z-axis direction. In a case where the first optical sheet 2, the second optical sheet 3 and the diffusion plate 4 are not provided, the light emission surface 200a is the opening part 30f of the reflection member 30. In this case, the light emission surface 200a is an imaginary surface in a position of the opening part 30f. The light emission surface 200a is a surface parallel to the X-Y plane.

The X-Y plane is a plane including an X-axis and a Y-axis perpendicular to a Z-axis. In this regard, the X-axis and the Y-axis are perpendicular to each other. Further, the light source 10 is a laser light source.

FIG. 3 is a configuration diagram schematically illustrating a configuration of a liquid crystal display apparatus 100 of Embodiment 1 of the present invention. In the liquid crystal display apparatus 100 of Embodiment 1, the planar light source device 200 and a liquid crystal display element 1 are stacked in the Z-axis direction. The planar light source device 200 is disposed so that the light emission surface 200*a* is parallel to the X-Y plane. The liquid crystal display element 1 is disposed so that a display surface 1*a* is parallel to the X-Y plane. The light emission surface 200*a* of the planar light source device 200 and a back surface 1*b* of the liquid crystal display element 1 are disposed so as to face each other. The light source 10 is disposed on the right side as viewed from the display surface 1*a* side of the liquid crystal display apparatus 100.

The planar light source device 200 emits illumination light 10*b* toward the back surface 1*b* of the liquid crystal display element 1. In other words, in FIG. 1, the planar light source device 200 emits the illumination light 10*b* in the positive Z-axis direction. The illumination light 10*b* is planar light having a uniform light-intensity distribution in the X-Y plane in FIG. 1. In FIG. 3, the illumination light 10*b* is shown by thick arrows.

The optical sheet 3 of Embodiment 1 has a function to direct the illumination light 10*b* emitted from the planar light source device 200 to a normal direction with respect to the display surface 1*a* of the liquid crystal display apparatus 100. In FIG. 3, the normal direction is the Z-axis direction.

FIG. 2 is a configuration diagram illustrating the unit 300*a*, which is the smallest unit constituting the luminance distribution converting device 300, as viewed from the negative Z-axis direction. The unit 300*a* includes the light source 10 and the reflection member 30. The reflection member 30 is surrounded by five surfaces, i.e., the side-plate parts 30*a* and 30*b* parallel to the Y-Z plane, the side-plate parts 30*c* and 30*d* parallel to the Z-X plane, and the bottom-plate part 30*e* parallel to the X-Y plane. As described above, the reflection member 30 includes five plate-like parts. The term "plate-like" includes thin sheet-like shape. The five plate-like parts are the side-plate parts 30*a*, 30*b*, 30*c* and 30*d*, and the bottom-plate part 30*e*. In this regard, the side-plate parts 30*a* and 30*b* are surfaces facing each other. Further, the side-plate parts 30*c* and 30*d* are surfaces facing each other. The side-plate parts 30*a*, 30*b*, 30*c* and 30*d* and the bottom-plate part 30*e* have inner surfaces which are reflection surfaces. As illustrated in FIG. 3, the opening part 30*f* is provided in the positive Z-axis direction so as to face the bottom-plate part 30*e*.

The light source 10 is disposed in the vicinity of the side-plate part 30*a* of the unit 300*a*. The term "in the vicinity" means being nearby, and does not require contact. In FIG. 2, a light emission part of the light source 10 is inserted into an inside of the unit 300*a* through the hole 31. Further, the light source 10 may be disposed so that the light emission part of the light source 10 and the side-plate part 30*a* are aligned on the same plane. Further, the light source 10 may be disposed so that the light emission part of the light source 10 is located slightly outside the side-plate part 30*a*.

A light beam 10*a* emitted from the light source 10 enters the inside of the unit 300*a* through the hole 31 provided on the side-plate part 30*a* of the unit 300*a*. Then, the light beam 10*a* travels in the positive X-axis direction. An optical axis of the light beam 10*a* is parallel to the X axis. After entering the unit 300*a*, the light beam 10*a* diverges at a divergence angle thereof, and propagates through a space in the unit 300*a*. Here, the term "optical axis" means an angular direction corresponding to a centroid of an angular intensity distribution of light. The term "divergence angle" means an angle at which light diverges. The light beam 10*a* propagating through the space in the unit 300*a* has the divergence angle. Therefore, a part of the light beam 10*a* is reflected at the side-plate parts 30*c* and 30*d* parallel to the optical axis of the light beam 10*a*. The side-plate parts 30*c* and 30*d* which are reflection surfaces change a traveling direction of the light beam 10*a*. In this regard, it is also possible that the light beam 10*a* emitted from the light source 10 enters through the bottom-plate part 30*e* in the vicinity of the side-plate part 30*a* and is directed in the positive X-axis direction by using the reflection surface or the like.

The unit 300*a* of Embodiment 1 is an element that constitutes the luminance distribution converting device 300. The bottom-plate part 30*e* of the unit 300*a* has reflection characteristics having high diffusivity. Of the light beams 10*a*, the light beam 10*a* reflected at the bottom-plate part 30*e* is diffused. Therefore, a traveling direction of the light beam 10*a* reflected at the bottom-plate part 30*e* randomly changes. The side-plate parts 30*c* and 30*d* of the unit 300*a* have reflection characteristics having a certain specular reflection component. Of the light beams 10*a*, a part of light beams 10*a* reflected at the side-plate parts 30*c* and 30*d* is diffused. A remaining part of the light beams 10*a* is specularly reflected, and travel in the positive X-axis direction. The term "specular reflection" means complete reflection of light at a mirror or the like, and means that light from one direction is reflected and emitted in another direction. According to the law of reflection, an incidence angle and a reflection angle of light are the same angle with respect to a reflection surface. In contrast, the term "diffusion reflection" means reflection of light at a non-flat or rough surface. The diffusion reflection looks such that incident light is reflected at various angles. The diffusion reflection is also referred to as scattered reflection.

After the light beam 10*a* is diffused at the side-plate parts 30*c* and 30*d* and the bottom-plate part 30*e*, the traveling direction of the light beam 10*a* is directed to the positive Z-axis direction, and the light beam 10*a* is emitted through the opening part 30*f* of the luminance distribution converting device 300. Then, the light beam 10*a* passes through the diffusion plate 4, the optical sheet 3 and the optical sheet 2, and is emitted from the planar light source device 200 as the illumination light 10*b*. The light specularly reflected at the side-plate parts 30*c* and 30*d* travels in the positive X-axis direction without changing the traveling direction in the Z-X plane. The light beam 10*a* travels a certain distance in the positive X-axis direction while repeating the reflection along the traveling direction (the positive X-axis direction). As the light beam 10*a* travels in the positive X-axis direction, a certain amount of light is emitted in the positive Z-axis direction. That is, the illumination light 10*b* emitted from the unit 300*a* constituting the luminance distribution converting device 300 has a uniform luminance distribution in the X-axis direction.

Further, the light beams 10*a* reflected at diffusion parts of the side-plate parts 30*c* and 30*d* and at the bottom-plate part 30*e* are diffused. Therefore, the reflection of the light beam 10*a* at the diffusion parts of the side-plate parts 30*c* and 30*d* and at the bottom-plate part 30*e* is also effective for uniformizing a luminance distribution in the Y-axis direction. That is, a part of the light beams 10*a* is specularly reflected at the side-plate parts 30*c* and 30, and is emitted through the opening part 30f. Another part of the light beams 10a is diffused at the side-plate parts 30c and 30d and at the bottom-plate part 30e, and is emitted through the opening part 30f.

The bottom-plate part 30e includes a light reflection sheet on a surface thereof. A base material of the light reflection sheet is, for example, a resin such as polyethylene terephthalate. In particular, a diffusion structure inside the base material of the light reflection sheet has a high density in order to enhance diffusivity of light. Alternatively, the light reflection sheet is subjected to processing such as coating of beads on a sheet surface, or the like.

The side-plate parts 30c and 30d each includes a light reflection sheet on a surface thereof. A base material of the light reflection sheet is, for example, a resin such as polyethylene terephthalate. In particular, a diffusion structure inside the base material of the light reflection sheet has a low density in order to obtain a certain specular reflection characteristics. Alternatively, the light reflection sheet is subjected to processing such as coating to smooth a surface, or the like. By changing the structures of the light reflection sheets of the side-plate parts 30c and 30d, a ratio between a specular reflection component and a diffusion reflection component can be adjusted. By changing the structures of the light reflection sheets of the side-plate parts 30c and 30d, light reflection characteristics is changed. By adjusting the ratio between the specular reflection component and the diffusion reflection component at the light reflection sheet, the luminance distribution of light emitted from the unit 300a can be adjusted in the X-axis direction.

Further, the side-plate parts 30c and 30d may be such that pigments or the like having light diffusion reflection characteristics are coated on an arbitrary area of a substrate deposited with aluminum, silver or the like whose reflection characteristics have high specular reflection component.

FIGS. 4(A) and 4(B) are configuration diagrams schematically illustrating an inner surface of the side-plate part 30d of the unit 300a. For example, as illustrated in FIGS. 4(A) and 4(B), dot-shaped pigments may be coated on a surface of a specular reflection substrate at an arbitrary density. In this case, the reflection characteristics at the side-plate parts 30c and 30d are determined by the ratio between the specular reflection component and the diffusion reflection component. That is, the reflection characteristics can be finely adjusted by a ratio of an area of a diffusion reflection material such as pigments and the like to a surface area of the specular reflection substrate. In FIGS. 4(A) and 4(B), adjustment is performed by the number of the dot-shaped pigments per unit area. Besides the example illustrated in FIGS. 4(A) and 4(B), it is also possible to change a size of a pigment.

Moreover, in order to finely adjust a luminance distribution in the traveling direction of the light beam 10a, the ratio of the area of the diffusion reflection material such as pigments and the like to the surface area of the specular reflection substrate may be changed in the Z-X plane. For example, as illustrated in FIGS. 4(A) and 4(B), the ratio of the area of the diffusion reflection material such as pigments and the like to the surface area of the specular reflection substrate is changed in the positive X-axis direction. In this way, the luminance distribution of light emitted from the unit 300a can be adjusted in the X-axis direction. Although FIGS. 4(A) and 4(B) illustrate the side-plate part 30d as an example, the side-plate part 30c has the same structure.

FIG. 4(A) illustrates an example of a case where the light beam 10a enters from the negative X-axis direction. FIG. 4(B) illustrates an example of a case where the light beams 10a enter from both of the negative X-axis direction and the positive X-axis direction. The light beam 10a reflected at a surface of the specular reflection substrate travels in the X-axis direction. In contrast, the light beam 10a reflected at a part where the diffusion reflection material is coated is diffused and is emitted to an outside of the unit 300a. In the vicinity of a light-incidence surface (the side-plate part 30a), an amount of light of the light beam 10a is large, and therefore a ratio of the area of the diffusion reflection material is small. In a part where the amount of light decreases after the light beam 10a travels in the X-axis direction and is partially emitted outside, a ratio of the area of the diffusion reflection material is large.

The diffusion plate 4 of Embodiment 1 includes particles therein, and the particles causes volume scattering of light. That is, light passing through the diffusion plate 4 is diffused, a part of the light passes through the diffusion plate 4, and another part of the light is reflected backward. The term "volume scattering" means entering a scattering material from a free space and being scattered inside the scattering material. Here, a base material of the diffusion plate 4 corresponds to the free space, and the particles that diffuse the light correspond to the scattering material.

The light reflected backward is diffused and reflected at the side-plate parts 30c and 30d and the bottom-plate part 30e, and a part of the light travels in the positive Z-axis direction and becomes the illumination light 10b. In the diffusion plate 4, diffusivity, light transmittance and a ratio of the light reflected backward can be adjusted by changing a density of the particles causing volume-scattering. Further, in the diffusion plate 4, the diffusivity, the light transmittance and the ratio of the light reflected backward can be adjusted by changing a thickness of the plate.

The optical sheet 2 of Embodiment 1 is a reflection-type polarizing film. The optical sheet 2 transmits light having an arbitrary polarization, and reflects light having a polarization in a direction perpendicular to that of the transmitted light. In Embodiment 1, the light source 10 is a laser, and therefore the light beam 10a has a linear polarization. However, as a result of the diffusion reflection at the side-plate parts 30c and 30d and the bottom-plate part 30e, the polarization of the light beam 10a is disturbed and the light beam 10a has a random polarization. When the light beam 10a having the random polarization enters the optical sheet 2, a half of the light passes through the optical sheet 2, and the rest of the light is reflected backward. The backward-reflected light beam 10a is diffused and reflected at the side-plate parts 30c and 30d and the bottom-plate part 30e, and the polarization is rotated, so that the light beam travels again in the positive Z-axis direction and becomes the illumination light 10b.

As described above, in Embodiment 1, the diffusion plate 4, the optical sheet 2 or the like are provided, and therefore an optical path of the light beam 10a emitted from the unit 300a becomes complex. For this reason, an in-plane luminance distribution of the illumination light 10b emitted from the planar light source device 200 can be further uniformized in the X-Y plane. The illumination light 10b emitted from the unit 300a includes the light beam 10a emitted directly from the light source 10, and the light beam 10a emitted after being diffused and reflected at the side-plate parts 30a, 30b, 30c and 30d and the bottom-plate part 30e.

In Embodiment 1, the side-plate parts 30c and 30d are parallel to the Z-X plane. However, the present invention is not limited to this example. The side-plate parts 30c and 30d may be inclined toward the Z-X plane. In this case, the bottom-plate part 30e has, for example, a trapezoidal shape.

In a case where the units 300a are arranged, the reflection members 30 can be disposed so that an upper base of the trapezoidal shape of one of the bottom-plate part 30e and a lower base of the trapezoidal shape of the adjacent bottom-plate part 30e are in line with each other. Further, the side-plate parts 30c and 30d may have curvatures. By providing the side-plate parts 30c and 30d with these shapes, the in-plane luminance distribution in a direction (the Y-axis direction in FIG. 1) perpendicular to an optical-axis direction of the light source 10 in a plane parallel to the light emission surface 200a can be adjusted. The term "in-plane luminance distribution" means a distribution of a luminance level with respect to two-dimensionally expressed positions in an arbitrary plane. Here, the term "in-plane" means being within a range of the display surface 1a of the liquid crystal display element 1.

A principal feature of the present invention is to uniformize the in-plane luminance distribution of the illumination light 10b emitted from the planar light source device 200 by optimizing the directivity of the laser and the reflection characteristics at the side-plate parts 30c and 30d. The reflection characteristics are obtained by adjusting the ratio between the specular reflection component and the diffusion reflection component.

More specifically, the principal feature of the present invention is to emit a certain amount of the light beam 10a in the positive Z-axis direction from the unit 300a at regular distance intervals along the traveling direction of the light beam 10a while maintaining the directivity of the laser light beam 10a. In other words, the principal feature of the present invention is to uniformize the in-plane luminance distribution of the illumination light 10b by controlling a ratio of an amount of light of the laser light beam 10a whose directivity is maintained and a ratio of an amount of light emitted in the positive Z-axis direction from the unit 300a. In order to maintain the directivity of the laser light beam 10a, it is desirable that regions of the side-plate parts 30c and 30d in the vicinity of a part (the side-plate part 30a) through which the laser light beam 10a enters are parallel to the Z-X plane.

The present invention provides a configuration effective for use with a laser having high directivity. By making use of the directivity of the laser, the planar light source device 200 is capable of finely controlling the ratio of the amount of light of the laser whose directivity is maintained and the ratio of the amount of light emitted in the positive Z-axis direction from the unit 300a.

The unit 300a of the luminance distribution converting device 300 of Embodiment 1 has a rectangular shape having long sides along the traveling direction of the light from the light source 10 as viewed from the positive Z-axis direction. An amount of light emitted by a single laser element is large. For example, the number of laser elements needed to achieve the same luminance as that of LED elements can be reduced. The reduction of the number of the laser elements leads to a reduction of the number of peripheral components of the laser elements. The peripheral components of the laser elements include electronic-circuit components for driving the laser elements or the like. As a result of the reduction of the number of the peripheral components of the laser elements, a configuration of the planar light source device 200 can be simplified. Further, by simplifying the configuration of the planar light source device 200, assembling efficiency can be enhanced and productivity can be enhanced. Further, the reduction of the number of the peripheral components of the laser elements is effective for reducing cost of the planar light source device 200.

In the luminance distribution converting device 300 of Embodiment 1, the laser having high directivity is used as the light source 10. Further, the luminance distribution converting device 300 includes surfaces of the side-plate parts 30c and 30d at which an arbitrary amount of light is diffused. With such features, the luminance distribution converting device 300 is capable of uniformizing the light intensity distribution for a long distance in the traveling direction of the light source 10. That is, as a region illuminated by a single laser element has a rectangular shape, the illuminated region can be enlarged. As the laser light having high directivity is used, enlargement of the planar light source device 200 can be easily achieved. Further, enlargement of a screen of the liquid crystal display apparatus 100 can be easily achieved.

Further, the unit 300a is configured so that the luminance distribution in a direction (the Y-axis direction in FIG. 1) perpendicular to the traveling direction of the light beam 10a in the plane parallel to the light emission surface 200a can be adjusted by changing the following sizes. The first is a thickness from the bottom-plate part 30e to the diffusion plate 4 (a length in the Z-axis direction in FIG. 1). The second is a distance between the side-plate part 30c and the side-plate part 30d. The third is a distance from the light source 10 to the bottom-plate part 30e or a distance from the light source 10 to the diffusion plate 4.

The light source 10 of Embodiment 1 has high directivity. Further, the light source 10 has different divergence angles in two axis directions perpendicular to each other. For example, in the light source 10 of Embodiment 1, a full angle at half maximum is 40 degrees in a fast-axis direction in which the divergence angle is large. Further, in the light source 10, the full angle at half maximum is 5 degrees in a slow-axis direction perpendicular to the fast-axis direction and in which the divergence angle is small. The term "full angle at half maximum" means an angle (full angle) between a direction where the light intensity is maximum and a direction where light intensity is 50% of the maximum intensity.

In Embodiment 1, the light source 10 is disposed so that the slow-axis direction and a thickness direction of the unit 300a (a direction perpendicular to the bottom-plate part 30e and the diffusion plate 4, i.e., the Z-axis direction in FIG. 1) are parallel. The slow-axis direction is a direction where the divergence angle is small. The light source 10 is disposed so that the fast-axis direction and a width direction of the unit 300a (a direction perpendicular to the side-plate parts 30c and 30d, i.e., the Y-axis direction in FIG. 1) are parallel. The fast-axis direction is a direction where the divergence angle is large. This is in order to increase an amount of light reflected at the side-plate parts 30c and 30d. In other words, in order to increase the amount of light of the light beam 10a whose traveling direction is controlled as a result of reflection at the side-plate parts 30c and 30d.

However, a disposing manner of the light source 10 should be optimized in accordance with shapes such as a divergence angle of the light source 10, a thickness of the reflection member 30, a width of the reflection member 30, a length of the reflection member 30 or the like. Therefore, the disposing manner of the light source 10 is not limited to the disposing manner described in Embodiment 1.

In Embodiment 1, the light source 10 is constituted by laser elements each including a semiconductor laser that emits red, green or blue monochromatic light. That is, the light source 10 emits white light. These laser elements are disposed closely in the Y-axis direction or the Z-axis direction in FIG. 1. In other words, the laser elements are arranged in the Y-axis direction or the Z-axis direction in FIG. 1. Further, these laser elements are disposed closely in the Y-Z plane in FIG. 1. In other words, the laser elements are arranged in the Y-Z plane in FIG. 1.

For example, light emitted from a red semiconductor laser has a wavelength of 640 nm. Light emitted from a green semiconductor laser has a wavelength of 530 nm. Light emitted from a blue semiconductor laser has a wavelength of 450 nm. By mixing light of these three colors, white light is produced. The wavelengths of light emitted from the semiconductor lasers are not limited to this example, but optimized for a desired color-reproduction range. Further, the number of colors of light is not limited to three colors, but is optimized for the desired color-reproduction range. Further, a configuration including a plurality of laser elements for each color may be employed.

Figure 5:
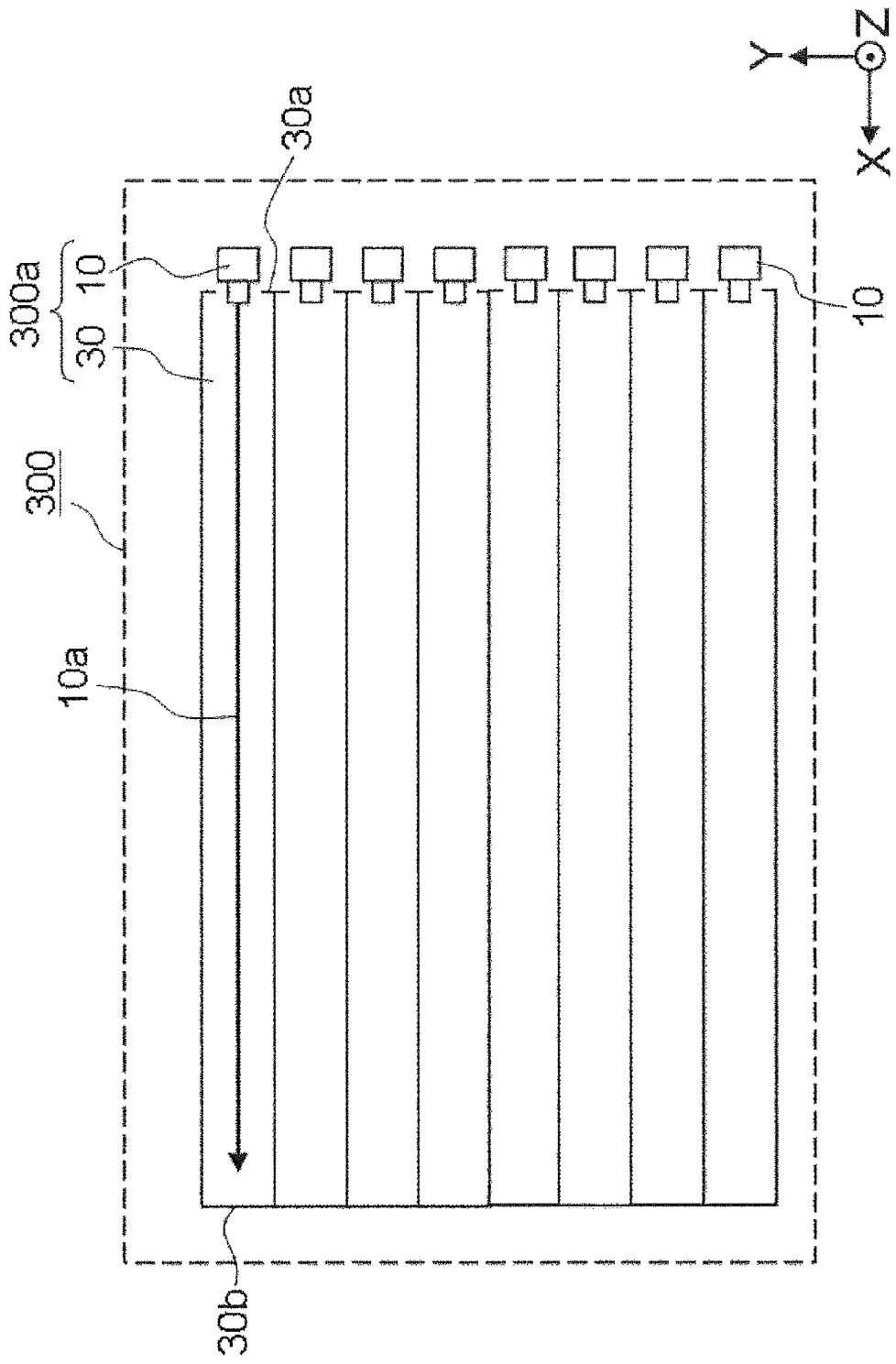
FIG. 5 is a configuration diagram schematically illustrating a luminance distribution converting device of Embodiment 1 of the present invention.

The luminance distribution converting device 300 is produced by arranging the plurality of the units 300a configured as described above. The term "arranging" means arranging in line with each other. Here, the plurality of units 300a are arranged so that the side-plate part 30c of one of the units 300a is in contact with the side-plate part 30d of another one of the units 300a as illustrated in FIG. 5. FIG. 5 is a configuration diagram schematically illustrating the luminance distribution converting device 300. As illustrated in FIG. 5, the luminance distribution converting device 300 of Embodiment 1 includes eight units 300a arranged in a vertical direction (the Y-axis direction in FIG. 5) with respect to a screen of the liquid crystal display apparatus 100. An optical axis of the light beam 10a emitted from the light source 10 is parallel to a horizontal direction (the X-axis direction in FIG. 5) of the liquid crystal display apparatus 100. The light beam 10a travels from the negative X-axis direction to the positive X-axis direction in FIG. 5.

In the image display apparatus 100 of Embodiment 1, the liquid crystal display element 1 is stacked on the planar light source device 200 in the positive Z-axis direction. The liquid crystal display element 1 includes a liquid crystal layer. The liquid crystal layer is disposed in parallel to the X-Y plane perpendicular to the Z-axis direction. The display surface 1a of the liquid crystal display element 1 has a rectangular shape. Two sides of the display surface 1a perpendicular to each other are respectively parallel to the X-axis direction and the Y-axis direction as illustrated in FIG. 3.

Figure 6:
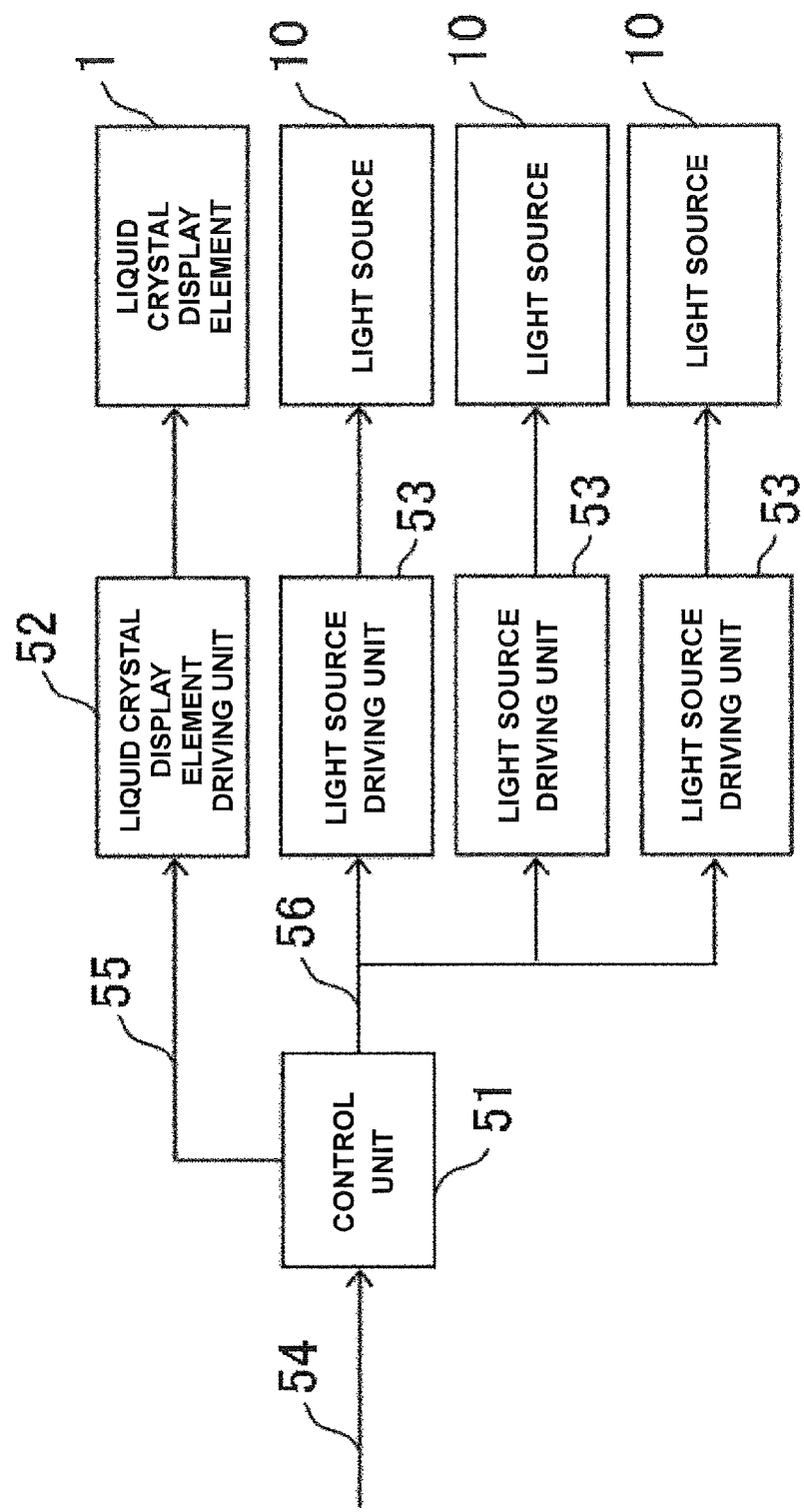
FIG. 6 is a block diagram illustrating a method of driving a liquid crystal display element and light sources of Embodiment 1.

FIG. 6 is a block diagram illustrating a method of driving the liquid crystal display element 1 and the light source 10. A control unit 51 receives a video signal 54. The control unit 51 sends a liquid crystal display element control signal 55 to a liquid crystal display element driving unit 52. Further, the control unit 51 sends a light source control signal 56 to a light source driving unit 53. As illustrated in FIG. 6, the liquid crystal display element driving unit 52 changes light transmittance of the liquid crystal layer on a pixel to pixel basis in accordance with a control signal (the liquid crystal display element control signal 55) supplied from the control unit 51. Each pixel includes three subpixels. These subpixels include color filters that respectively transmit only red light, green light or blue light. In other words, one pixel includes a subpixel having a color filter transmitting only red light, a subpixel having a color filter transmitting only green light, and a subpixel having a color filter transmitting only blue light.

The liquid crystal display element driving unit 52 produces a color image by controlling the transmittance of each subpixel. Thus, the liquid crystal display element 1 spatially modulates the illumination light 10b emitted from the planar light source device 200 to produce image light. The liquid crystal display element 1 is capable of emitting the image light through the display surface 1a. The term "image light" means light including image information.

In the image display apparatus 100 of Embodiment 1, the light source driving units 53 are individually provided for the respective light sources 10 of the units 300a. In other words, by individually controlling the light sources 10 included in the planar light source device 200, lighting of the plurality of units 300a can be individually controlled. Further, by individually controlling the light sources 10, luminance of the plurality of units 300a can be individually adjusted. By individually controlling the light sources 10, light emission amounts of the respective light sources 10 can be adjusted in accordance with the respective video signals 54 which are input signals. That is, light emission amounts of the respective light sources 10 are adjusted in accordance with information on brightness or color at each position of an input image. Therefore, an amount of light in a region illuminated by one unit 300a can be adjusted in accordance with the input image.

By individually controlling the light sources 10, the image display apparatus 100 is capable of reducing power consumption. Further, by changing a lighting position on the units 300a in accordance with driving of the liquid crystal layer of the liquid crystal display element 1, a sense of afterimage which is a problem in liquid crystal display apparatuses can be reduced. In other words, the sense of afterimage can be reduced by selecting the unit 300a to be lighted.

Figure 7:
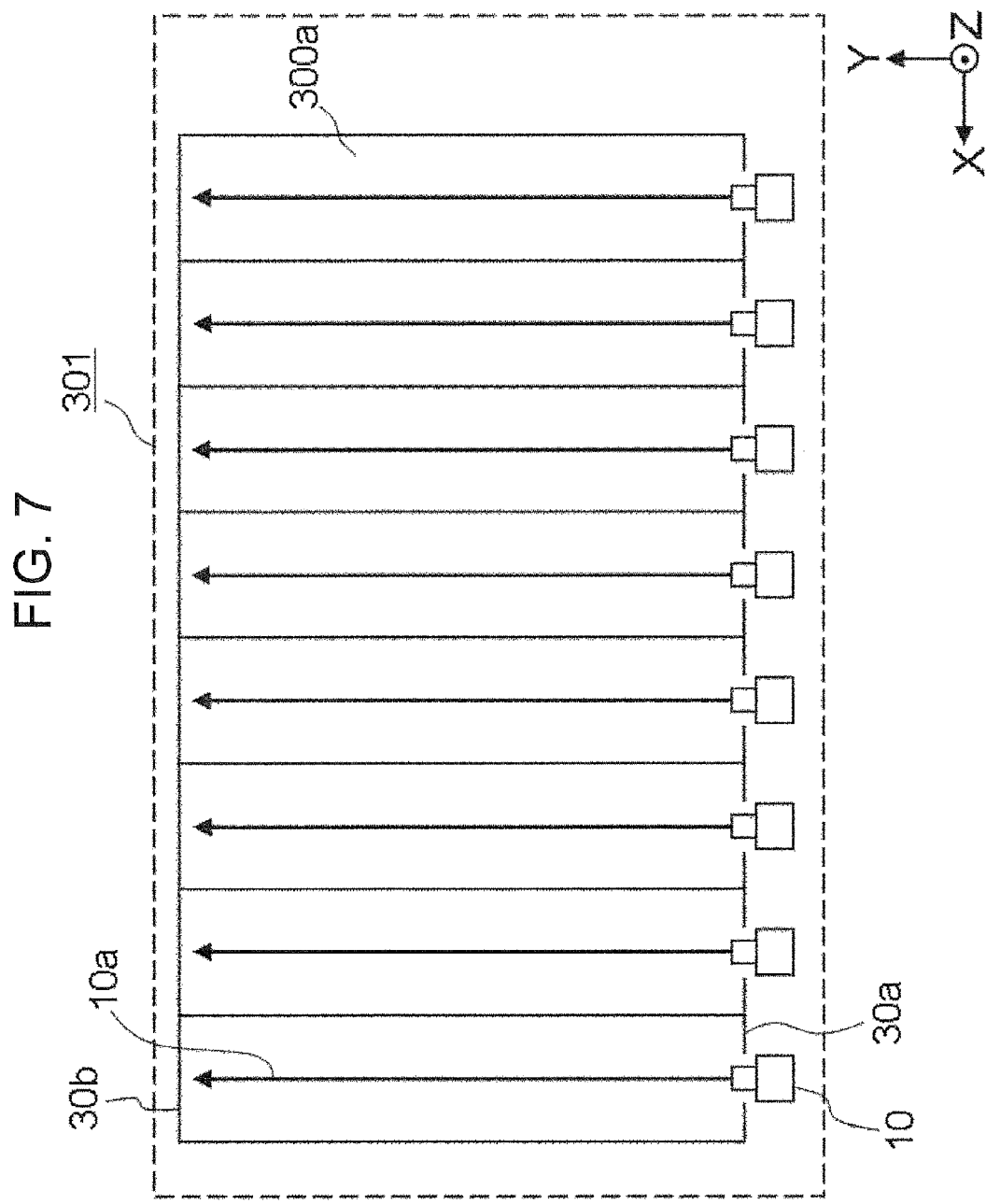
FIG. 7 is a configuration diagram schematically illustrating the luminance distribution converting device of Embodiment 1.

The luminance distribution converting device employed in the planar light source device 200 according to the present invention is not limited to the configuration of the luminance distribution converting device 300 illustrated in FIG. 5. FIG. 7 is a configuration diagram schematically illustrating a luminance distribution converting device 301. For example, in the luminance distribution converting device 301 illustrated in FIG. 7, the light sources 10 of the units 300a are disposed on a lower side (a side in the negative Y-axis direction) of the liquid crystal display apparatus. In other words, the light sources 10 are disposed on a lower end side of the planar light source device 200. The light source 10 emits the light beam 10a in the positive Y-axis direction. The plurality of units 300a are arranged in a horizontal direction (the X-axis direction) of the display surface 1a of the liquid crystal display apparatus 100. The term "horizontal direction of the display surface 1a" means a left-right direction of the liquid crystal display apparatus 100. In this case, the light beam 10a emitted from the light source 10 travels in a direction parallel to a vertical direction (the Y-axis direction in FIG. 7) of the display surface 1a of the liquid crystal display apparatus 100. The term "vertical direction of the display surface 1a" means the vertical direction of the liquid crystal display apparatus 100.

In the luminance distribution converting device 301, the light source 10 is disposed on the lower side (the side in the negative Y-axis direction) of the liquid crystal display apparatus 100, and therefore a thermal load on the light source can be relieved. The planar light source device 200 includes a lot of heat generating elements such as a power-supply board, a board for driving the light source 10, a board for driving the liquid crystal display element 1, and the like. Further, the light source 10 itself is also a heat generating element. Heat radiated from these heat generating elements moves in an upward direction (in the positive Y-axis direction) of the liquid crystal display apparatus 100. Therefore, heat releasing ability of the light source 10 disposed on an upper side (a side in the positive Y-axis direction) of the heat generating element decreases. For this reason, by providing the light source 10 on the lower side (a side in the negative Y-axis direction) of the liquid crystal display apparatus 100, the light source 10 is not likely to be influenced by heat from other heat generating elements. In other words, the light source 10 is disposed in a lower direction side with respect to the power-supply board, the board for driving the light source 10, the board for driving the liquid crystal display element 1 or the like. Therefore, decrease in the heat releasing ability of the light source 10 can be avoided.

Figure 8:
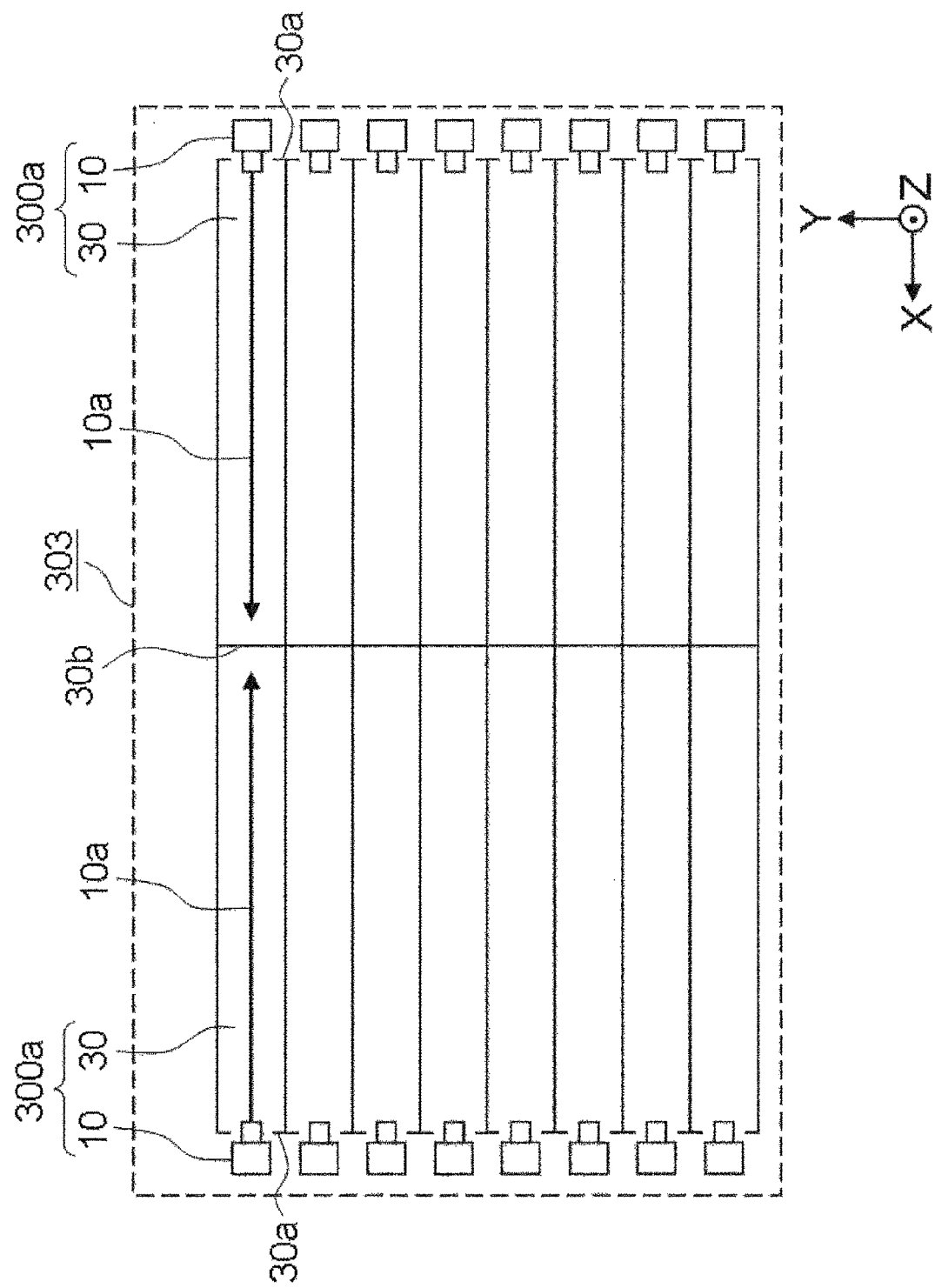
FIG. 8 is a configuration diagram schematically illustrating the luminance distribution converting device of Embodiment 1.

In a luminance distribution converting device 303 illustrated in FIG. 8, the plurality of units 300a are arranged in the vertical direction (the Y-axis direction) and in the horizontal direction (the X-axis direction) in a plane (an X-Y plane) parallel to the display surface 1a of the liquid crystal display apparatus 100. FIG. 8 is a configuration diagram schematically illustrating the luminance distribution converting device 303. In this case, the light source 10 of the unit 300a is disposed outside the reflection member 30 in the horizontal direction (the X-axis direction in FIG. 8) of the display surface 1a. In other words, the light source 10 on the positive X-axis direction side is disposed on the positive X-axis direction side of the reflection member 30. The light source 10 on the negative X-axis direction side is disposed on the negative X-axis direction side of the reflection member 30.

An optical axis of the light beam 10a emitted from the light source 10 is parallel to the horizontal direction (the X-axis direction in FIG. 8) of the display surface 1a. The light beam 10a travels toward a center in the horizontal direction (the X-axis direction in FIG. 8) of the luminance distribution converting device 303. That is, the light sources 10 are arranged in the vertical direction at a right end (an end in the negative X-axis direction) and at a left end (an end in the positive X-axis direction) of the liquid crystal display apparatus 100. The light source 10 disposed at the right end emits light in a left direction (the positive X-axis direction), and the light source 10 disposed at the left end emits light in a right direction (the negative X-axis direction).

Further, in Embodiment 1, one of the units 300a constituting the luminance distribution converting device 300 includes one light source 10. The light beam 10a enters through only one side-plate part 30a of the luminance distribution converting device 300. However, the present invention is not limited to this example.

Figure 9:
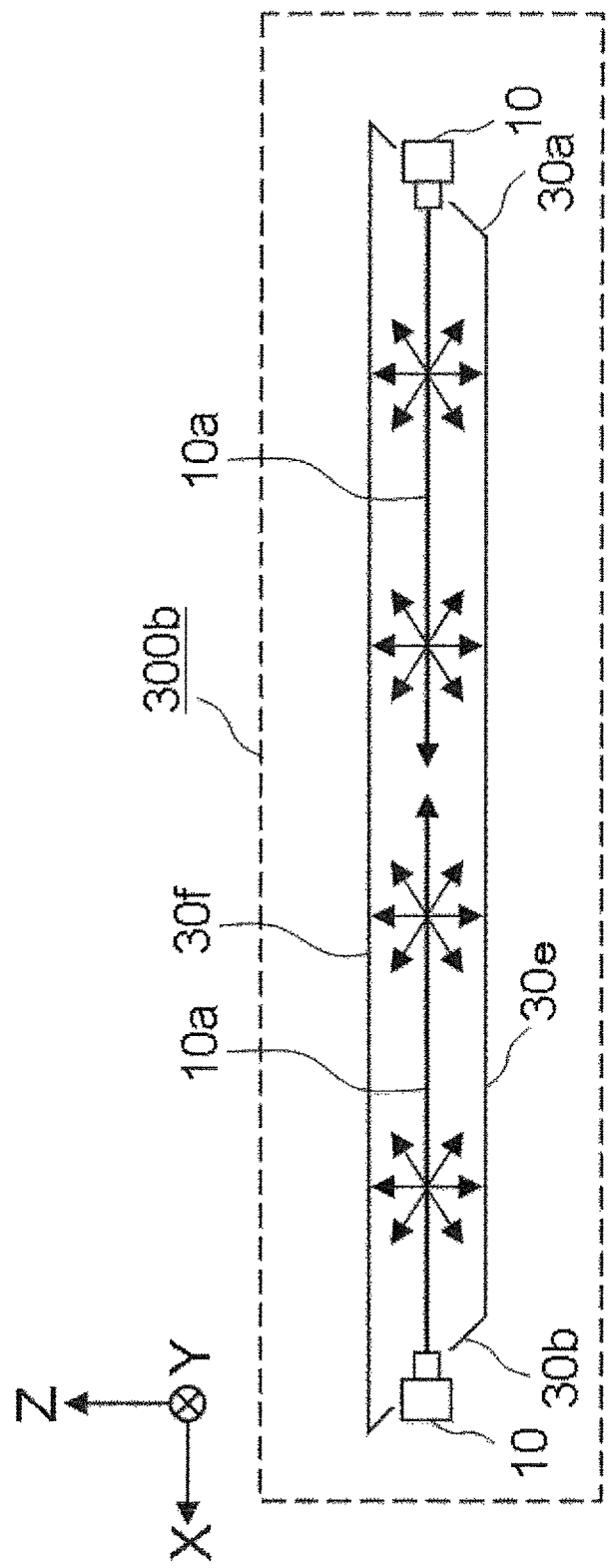
FIG. 9 is a configuration diagram schematically illustrating a configuration of the unit of Embodiment 1.

For example, a unit 300b illustrated in FIG. 9 includes the light sources 10 on the side-plate parts 30a and 30b on both ends of the unit 300b in the X-axis direction. FIG. 9 is a configuration diagram schematically illustrating a configuration of the unit 300b. The two light sources 10 are disposed so as to face each other. In this case, it is necessary to optimize reflection characteristics at the side-plate parts 30c and 30d in accordance with the configuration of the light sources 10. For example, as shown in FIG. 4(B), the side-plate parts 30c and 30d are formed of substrates having high specular reflection component on which dot-shaped pigments having diffusion reflection characteristics are deposited. The substrate having high specular reflection component is coated with, for example, aluminum, silver or the like having reflection characteristics. Density of the dot-shaped pigments having diffusion reflection characteristics is the lowest at a part through which the light beam 10a is emitted from the light source 10. The density of the dot-shaped pigments having diffusion reflection characteristics is the highest at a center part in the traveling direction of the light beam 10a. In this way, the uniform illumination light 10b can be produced by coating the dot-shaped pigments.

The side-plate parts 30a and 30b of the unit 300b are inclined with respect to the optical axis of the light beam 10a. Inclination angles of the side-plate parts 30a and 30b with respect to the bottom-plate part 30e are obtuse angles. In other words, the reflection surfaces of the side-plate parts 30a and 30b are inclined so as to face toward the opening part 30f side. The optical axis of the light beam 10a is parallel to the X-axis. The side-plate parts 30a and 30b of the unit 300b may be surfaces having curvatures.

FIG. 9 is a configuration diagram illustrating the unit 300b as viewed from the negative Y-axis direction. In FIG. 9, an upper side is a direction in which the light beam 10a is emitted from the unit 300b (the positive Z-axis direction). For example, as illustrated in FIG. 9, the side-plate parts 30a and 30b are inclined with respect to the X-Y plane so that the reflection surfaces face in the positive Z-axis direction. The light beam 10a reflected at the side-plate parts 30a and 30b travels in an emission direction from the unit 300b (the positive Z-axis direction). An amount of light emitted from the unit 300b at the both end parts of the unit 300b in the X-axis direction is small. For this reason, by inclining the side-plate parts 30a and 30b so as to actively direct the light beam 10a in the emission direction from the unit 300b, the amount of light can be increased at the both end parts of the unit 300b in the X-axis direction. In other words, by using the inclinations of the side-plate parts 30a and 30b, the in-plane luminance distribution can be uniformized.

The light source 10 can be disposed on an inner side with respect to the emission surface of the unit 300a (the opening part 30f). The term "emission surface of the unit 300a" means a surface facing the bottom-plate part 30e. In other words, the term "emission surface of the unit 300a" means the opening part 30f. In FIG. 9, a disposing interval of the two light sources 10 in the X-axis direction is shorter than a length of the emission surface (the opening part 30f) of the unit 300b in the X-axis direction. That is, when the light source 10 is viewed from the emission surface side (a side in the positive Z-axis direction), the light sources 10 are disposed so as to hide in a back side (a side in the negative Z-axis direction) of the emission surface (the opening part 30f). In other words, the light sources 10 are disposed on the back side (the side in the negative Z-axis direction) of the side-plate parts 30a and 30b. With such a configuration, it becomes possible to achieve a narrow picture-frame in the image display apparatus 100. The term "picture frame" means a frame cabinet part surrounding the liquid crystal panel. A term "narrow picture frame" means that a width of the frame cabinet is small as viewed from the display surface 1a side. In this regard, the light source 10 may be disposed so as to partially hide in the back side (the side in the negative Z-axis direction) of the emission surface. In other words, the light source 10 may be disposed so as to partially hide in the back side (the side in the negative Z-axis direction) of the side-plate parts 30a and 30b.

Figure 10:
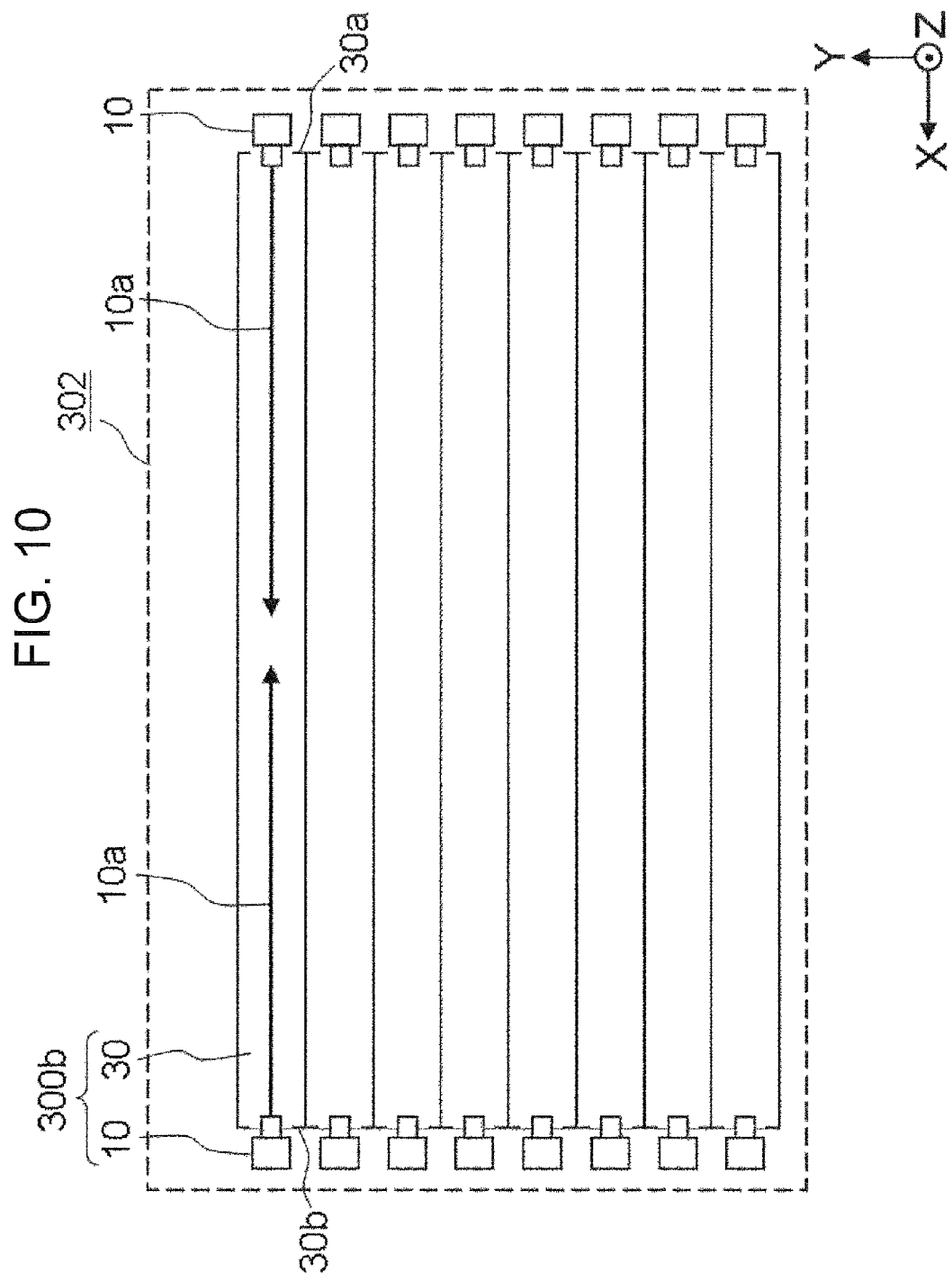
FIG. 10 is a configuration diagram schematically illustrating the luminance distribution converting device of Embodiment 1.

For example, when the configuration of the unit 300b illustrated in FIG. 9 is employed, a luminance distribution converting device 302 can be constituted by arranging the plurality of units 300b in the vertical direction (the Y-axis direction) of the screen of the liquid crystal display apparatus 100 as illustrated in FIG. 10. FIG. 10 is a configuration diagram schematically illustrating the luminance distribution converting device 302. Further, a configuration where the side-plate parts 30a and 30b are inclined may also be employed in the luminance distribution converting device 300, 301 or 303.

The planar light source device 200 includes the light source 10 and the reflection member 30. The light source 10 emits the light beam 10a having directivity. The reflection member 30 has a box shape including the single bottom-plate part 30e, the side-plate parts 30a, 30b, 30c and 30d connected to the bottom-plate part 30e, and the opening part 30f facing the bottom-plate part 30e. The inner surfaces of the box shape are the reflection surfaces. The bottom-plate part 30e has a quadrilateral shape including two facing short sides and two facing long sides. The light beam 10a enters the inside of the box shape of the reflection member 30 from a side of the side-plate part 30a connected to the short side of the bottom-plate part 30e, travels in the direction of the long sides of the bottom-plate part 30e while being reflected at the side-plate parts 30c and 30d connected to the long sides of the bottom-plate part 30e, and is emitted through the opening part 30f. The reflection surfaces of the side-plate parts 30c and 30d connected to the long sides of the bottom-plate part 30e include the regions at which the light beam 10a is specularly reflected and the regions at which the light beam 10a is diffused and reflected. In this regard, the quadrilateral shape of the bottom-plate part 30e includes, for example, a shape having four corners formed by curves. Further, the quadrilateral shape of the bottom-plate part 30e may also include, for example, a shape having four sides formed by curves such as arcs.

The reflection surfaces of the side-plate parts 30a and 30b connected to the short sides of the bottom-plate part 30e are inclined so as to face the opening part 30f side.

The planar light source device 200 includes the plurality of the reflection members 30. The plurality of the reflection members 30 are arranged so that the long sides of the bottom-plate parts 30e face each other.

The liquid crystal display apparatus 100 includes the planar light source device 200 and the liquid crystal display element 1. The liquid crystal display element 1 receives the light 10b emitted from the planar light source device 200, and emits the image light. The light source 10 is disposed on the lower end side of the planar light source device 200.

Embodiment 2

Figure 11:
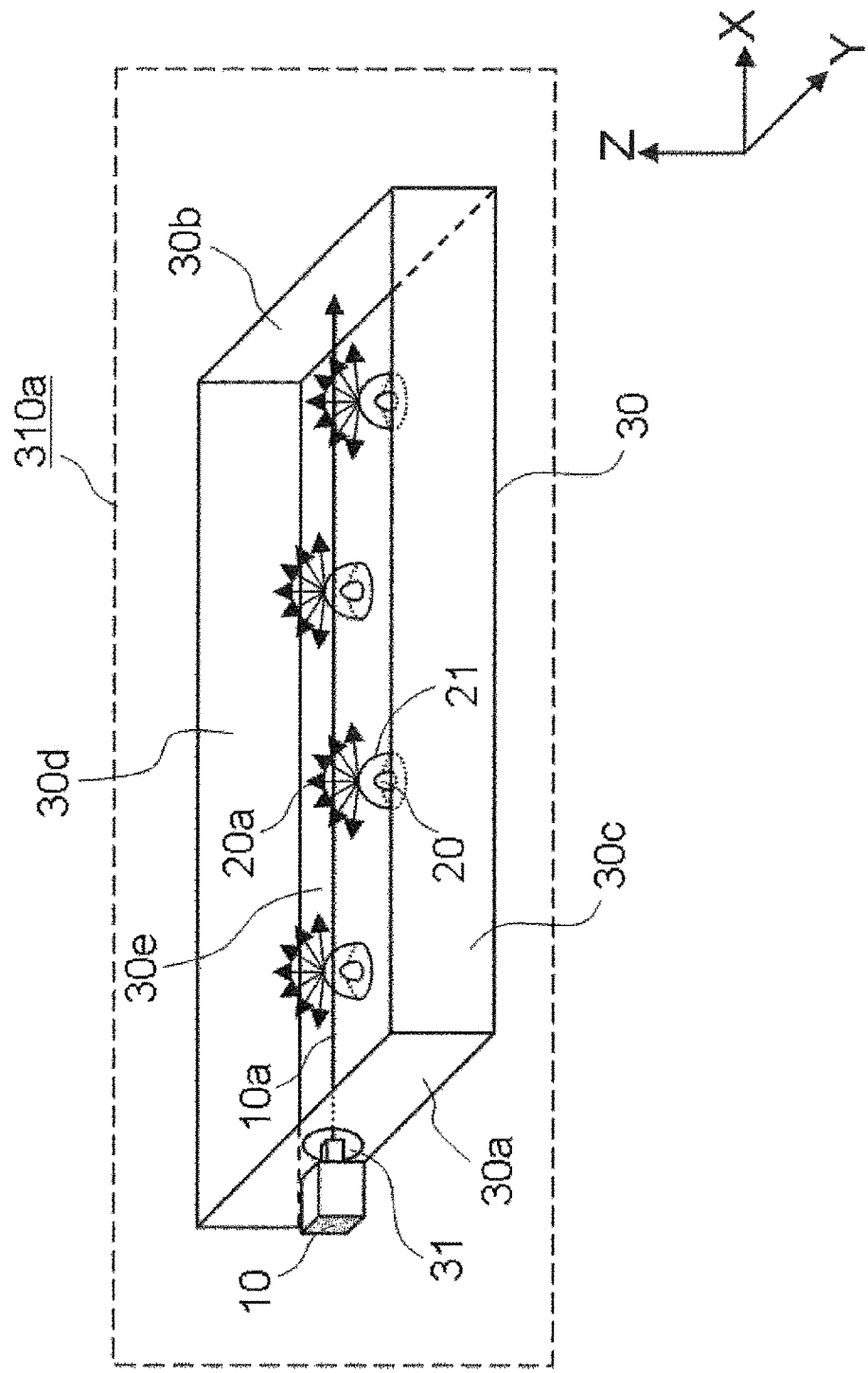
FIG. 11 is a configuration diagram schematically illustrating a configuration of a unit of Embodiment 2.

FIG. 11 is a configuration diagram schematically illustrating a configuration of a unit 310a included in a planar light source device 210 of Embodiment 2 of the present invention. The unit 310a of Embodiment 2 differs from the unit 300a of Embodiment 1 in that the unit 310a includes a light source 20 of a kind different from the light source 10 in addition to the light source 10. In other words, the configurations of the liquid crystal display element 1, the first optical sheet 2, the second optical sheet 3 and the diffusion plate 4 described in Embodiment 1 are similarly employed in Embodiment 2. The configurations of the unit 300a and 300b are similarly employed in Embodiment 2 except that the unit 310a includes the light source 20. In other words, the planar light source device 210 of Embodiment 2 is the same as the planar light source device 200 of Embodiment 1 except that the planar light source device 210 includes the unit 310a instead of the unit 300a. The unit 310a has characteristics in including the light source 20, and therefore it is also possible to employ a configuration where the unit 300b includes the light source 20. A luminance distribution converting device of the planar light source device 210 may employ the same configuration as that of the luminance distribution converting device 300, 301, 302 or 303 using the unit 300a or 300b.

A liquid crystal display apparatus 110 of Embodiment 2 is the same as the liquid crystal display apparatus 100 of Embodiment 1 except that the planar light source device 210 is included instead of the planar light source device 200, and a light source driving unit 57 for driving the light source is newly provided. The light source driving unit 57 receives the light source control signal 56 from the control unit 51 to drive the light source 20. The liquid crystal display apparatus 110 includes the control unit 51, the liquid crystal display element driving unit 52 and the light source driving unit 53 which are included in the liquid crystal display apparatus 100.

The elements that are the same as the elements of the liquid crystal display apparatus 100 described in Embodiment 1 are assigned with the same symbols, and detailed explanations thereof will be omitted. The light source 10 is a first light source. The light source 20 is a second light source.

The unit 310a of Embodiment 2 includes the light source 10 and the light sources 20. The light source 10 has a laser element that emits a red light beam 10a. The red light is light having a wavelength of, for example, 640 nm. The light source 20 has an LED element that emits a blue-green light beam 20a. The blue-green light is light having, for example, peaks at 450 nm and 530 nm and a continuous spectrum in a wavelength band from 420 nm to 580 nm. A configuration example of the light source 20 will be described below.

The LED element included in the light source 20 is formed by, for example, filling a green fluorescent substance in a package including a blue LED chip emitting blue light. The green fluorescent substance absorbs the blue light and emits green light.

Further, the LED element included in the light source 20 may employ, for example, a light source other than the LED as an excitation light source. The excitation light source excites a blue-green fluorescent substance to emit blue-green light.

Further, the light source 20 is formed by, for example, filling a fluorescent substance that emits blue-green light in a package including a light source emitting light having a wavelength of an ultraviolet region. The fluorescent substance absorbs the light having the wavelength of the ultraviolet region and emits blue light and green light.

Further, it is also possible that the light source 20 includes, for example, a blue LED chip that emits blue light and a green LED chip.

A reflection member 30 of the unit 310a includes side-plate parts 30a and 30b parallel to the Y-Z plane. The unit 310a includes side-plate parts 30c and 30d parallel to the Z-X plane. The unit 310a includes a bottom-plate part 30e parallel to an X-Y plane. The unit 310a is surrounded by five surfaces, i.e., the side-plate parts 30a, 30b, 30c and 30d, and the bottom-plate part 30e. In this regard, the side-plate parts 30a and 30b are surfaces facing each other. The side-plate parts 30c and 30d are surfaces facing each other. As described above, the reflection member 30 is constituted by five plate-like parts. The five plate-like parts are the side-plate parts 30a, 30b, 30c and 30d, and the bottom-plate part 30e.

The side-plate parts 30a, 30b, 30c and 30d and the bottom-plate part 30e have inner surfaces which are reflection surfaces. The term "inner surface" means an inner surface of the box shape of the reflection member 30. In other words, the reflection surfaces are a surface of the bottom-plate part 30e in the positive Z-axis direction, a surface of the side-plate part 30a in the positive X-axis direction, a surface of the side-plate part 30b in the negative X-axis direction, a surface of the side-plate part 30c in the negative Y-axis direction, and a surface of the side-plate part 30d in the positive Y-axis direction. The light source 10 is disposed on the side-plate part 30a side. The light beam 10a emitted from the light source 10 enters an inside of the reflection member 30 through a hole 31 provided on the side-plate part 30a. The light beam 10a is emitted toward the side-plate part 30b facing the side-plate part 30a. The configuration of the unit 310a is the same as the configuration of the unit 300a or 300b of Embodiment 1 except that the unit 310a includes the light source 20. Therefore, a behavior of the light beam 10a is the same as that described regarding the unit 300a or 300b of Embodiment 1.

In Embodiment 2, the light source 20 is included in addition to the light source 10. The light source 20 includes the LED element. The light beam 20a emitted from the light source 20 has an angular intensity distribution which is a Lambertian distribution. The light beam 20a has a very large divergence angle in comparison with the light beam 10a. The "Lambertian distribution" is a distribution where a luminance on a light emission surface is constant irrespective of viewing direction.

Since the light source 20 emits the light beam 20a having a large divergence angle, it is difficult to produce uniform planar light from the light sources 20 using the same configuration as the light source 10. This is because of the following reason. An amount of light reflected at the side-plate parts 30c and 30d is large in the vicinity of the light source 20 (in the vicinity of the side-plate part 30a). Therefore, the light beam 20a is emitted outside the unit 310a through an opening part 30f in the vicinity of the side-plate part 30a. For this reason, even if the light source 20 employs the same configuration as the light source 10, it is difficult to uniformize a luminance distribution for a long distance in the X-axis direction. Therefore, in the unit 310a of Embodiment 2, the light source 20 is provided with an optical system which is different from that provide with the light source 10.

As illustrated in FIG. 11, in the unit 310a of Embodiment 2, the light sources 20 are two-dimensionally arranged on the reflection surface of the bottom-plate part 30e of the planar light source device 210. The bottom-plate part 30e is a surface facing a light emission surface of the unit 310a. The "light emission surface of the unit 310a" is an imaginary surface provided on the opening part 30f.

The light source 20 includes a lens 21 that diffuses the light beam 20a toward the light emission surface. An illuminance distribution of the light beam 20a in the X-Y plane is uniformized by the lens 21. The light beam 20a is emitted toward the light emission surface of the unit 310a (in the positive Z-axis direction). The light beam 20a is superimposed on the light beam 20a emitted from adjacently disposed light source 20 on the X-Y plane. The superimposed light beams 20a are emitted from the unit 310a in the positive Z-axis direction as planar light having a uniform luminance distribution.

In Embodiment 2, a laser element having excellent monochromaticity is used for red color only. This is because a red laser is most excellent in mass productivity among semiconductor lasers suitable for use in displays under the current circumstances.

There is another reason. Particularly, a sufficient output of a green semiconductor laser is not yet been obtained. In this regard, in order to obtain green light more effectively, a suitable method is to excite a green fluorescent substance by light of another color to obtain green light.

The reason why the method of obtaining green light by using the green fluorescent substance is suitable will be described below. As a light source for exciting the green fluorescent substance, a semiconductor laser of a near-ultraviolet region, or a blue semiconductor laser or LED is used. These light sources have high light emission efficiency in comparison with the green semiconductor laser. Further, the green fluorescent substance has high light absorptivity and high internal conversion efficiency for near-ultraviolet light and blue light. For this reason, under the current circumstances, an element using the green fluorescent substance provides a higher light emission efficiency than an element using the green semiconductor laser.

Further, in the light source 20 of Embodiment 2, the blue LED element is used as the excitation light source for the fluorescent substance. This is because, in a configuration where the blue light-emitting element excites the fluorescent substance to obtain light of another color as in the light source 20 of Embodiment 2, it is desirable to use the LED than the laser as the blue light-emitting element. Here, the light of another color is explained as green light.

This is because of the following reason. An LED is driven by a low current, and a low output is obtained. In contrast, a laser is driven by a high current, and a high output is obtained. Since the laser is driven by the high current, a quantity of heat from the laser is very large while being driven. Further, light emitted from the LED has a wide divergence angle. In contrast, light emitted from the laser has a very small divergence angle. For this reason, in a case of the laser, intensity density of excitation light entering the fluorescent substance is very high. The term "intensity density" means intensity of light entering a unit area of the fluorescent substance. A part of the light entering the fluorescent substance and absorbed by the fluorescent substance is converted to light having another wavelength and emitted outside, and the remaining part of the light mainly becomes heat energy. Here, the light having another wavelength is explained as green light.

Generally, an internal conversion efficiency of a fluorescent substance is approximately 40% to 80%. The internal conversion efficiency is calculated from an amount of light converted to light having another wavelength with respect to an amount of absorbed light. In other words, simultaneously generated heat energy amounts to from 20% to 60% of incident light energy. Therefore, when the laser light of high output and high light intensity density enters the fluorescent substance, the quantity of heat of the fluorescent substance becomes very large.

An increase in the quantity of heat of the laser element itself causes a rise in a temperature of the fluorescent substance included in the light source together with the laser element. Further, the increase in the quantity of heat of the fluorescent substance itself also causes the rise of the temperature of the fluorescent substance. If the temperature of the fluorescent substance rises, the internal conversion efficiency of the fluorescent substance is significantly reduced, and causes a decrease in luminance and an increase in power consumption. For this reason, the light source 20 of Embodiment 2 employs the blue-green LED including the blue LED and the fluorescent substance excited by the blue light to emit green light.

Red is a color for which human sensitivity to color difference is high. Therefore, a difference in wavelength bandwidths of red color is perceived as a more notable difference by a human visual sense. Here, the wavelength bandwidth is a difference in color purity. White light produced by a conventional CCFL or LED contains a small amount of red light in particular, and has a wide wavelength bandwidth. Therefore, the white light produced by the conventional CCFL or LED has poor color purity. For this reason, in a liquid crystal display apparatus in which the CCFL or LED is used as a light source, there is a trade-off relationship between a red color-reproduction range and power consumption. In other words, there is a trade-off between ensuring the color-reproduction range by increasing an amount of light of the white CCFL or LED to thereby increase an amount of light of red color, and saving power consumption by reducing the color-reproduction range.

In contrast, a laser has a narrow wavelength bandwidth, and light with high color purity is obtained while reducing loss of light. For these reasons, an effect of reducing power consumption can be obtained when laser light is used as red light among the three primary colors.

This is because the laser light has very high monochromaticity and high transmittance through a red filter. Therefore, a sufficient amount of red light can be obtained without increasing an amount of light. Furthermore, the effect of reducing power consumption can be obtained. Further, because of high monochromaticity, the color purity is enhanced, and an effect of widening the color-reproduction range is obtained. For the above described reasons, the liquid crystal display apparatus 110 of Embodiment 2 employs the laser as the red light source.

Further, in the liquid crystal display apparatus using the conventional CCFL or LED as light sources, a wavelength bandwidth of red light is wide. Regarding transmission characteristics of a red filter and a green filter, there is an overlapping part between adjacent wavelengths. Therefore, a part of red light passes through the green filter. Green is a color whose spectrum is adjacent to that of red. For this reason, in the liquid crystal display apparatus using the conventional CCFL or LED as the light sources, the color purity of green is reduced because of the red light. However, in the liquid crystal display apparatus 110 of Embodiment 2, the color purity is enhanced, and therefore an amount of red light passing through the green filter can be reduced, and the color purity of green can be enhanced. Thus, an effect of widening the color-reproduction range can be achieved.

In Embodiment 2, the first light source 10 is the laser element that emits red light. Further, the second light source 20 is the LED element that emits blue-green light. However, the present invention is not limited to this example.

For the above described reason, for example, the first light source 10 may be constituted by a laser element that emits red light and a laser element that emits blue light, and the second light source 20 may be constituted by an LED element that emits green light.

Further, for example, the first light source 10 may be constituted by a laser element that emits blue light, and the second light source 20 may be constituted by an LED element that emits red light and an LED element that emits green light. In this regard, when a laser light source is used only for the red light source, it becomes possible to remarkably differentiate from the conventional liquid crystal display apparatus rather than when a laser light source is used only for the blue light source, because of the above described difference in human sensitivity to color difference.

A suitable configuration for the planar light source device 210 of Embodiment 2 is a configuration where the first light source 10 includes the laser element and the second light source 20 includes the LED element.

Figure 12:
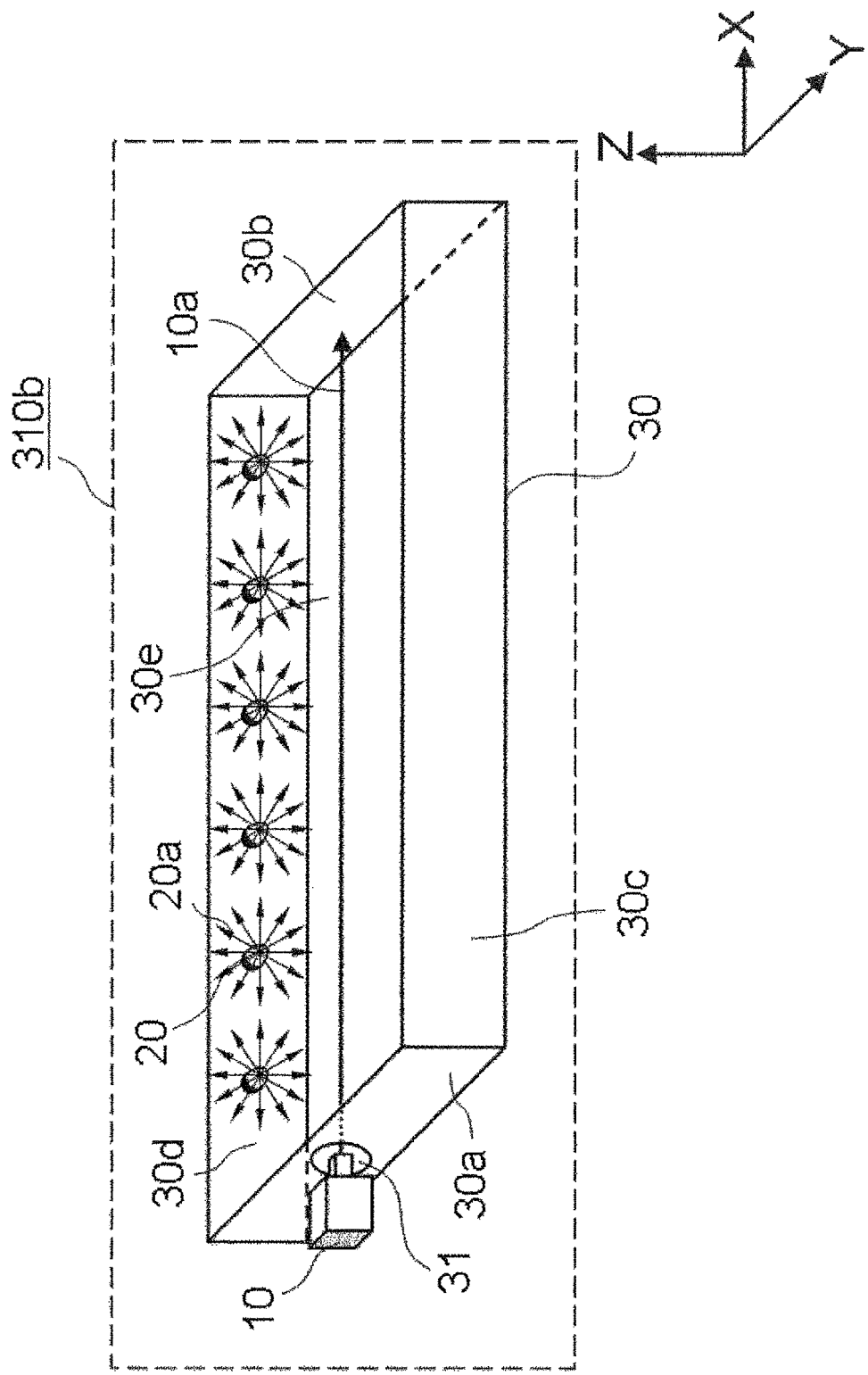
FIG. 12 is a configuration diagram schematically illustrating a configuration of the unit of Embodiment 2.

The planar light source device 210 of Embodiment 2 has a configuration where the second light sources are two-dimensionally arranged on the bottom-plate part 30e of the unit 310a. However, the present invention is not limited to this example. For example, a unit 310b illustrated in FIG. 12 includes the light sources 20 on the side-plate part 30d. FIG. 12 is a configuration diagram schematically illustrating a configuration of the unit 310b. In the unit 310b, the reflection member 30 having a rectangular shape is employed in order to convert a luminance distribution of the light source 10. The unit 310b includes the light sources 20 on the side-plate part (30d in FIG. 12) perpendicular to the side-plate part (30a in FIG. 12) on which the light source 10 is provided. An optical axis of a light beam 20a is parallel to a direction of short sides of the unit 310b (the Y-axis direction in FIG. 12). In this case, the light sources 20 are disposed at equal intervals in a one-dimensional direction (an X-axis direction in FIG. 12) on the side-plate part 30d. Further, in order to prevent the light beam 10a of the light source 10 from entering into the light sources 20, the light sources 20 are disposed in different positions from that of the light source 10 in the Z-axis direction. In a case where a length of the side-plate part 30d in the Z-axis direction is long, the light sources 20 may be two-dimensionally disposed as is the case with the unit 310a.

According to the unit 310b, the light beam 20a emitted from the light source 20 in the positive Y-axis direction in FIG. 12 propagates in the unit 310b, while diverging at a divergence angle thereof. A part of the light beam 20a is directly emitted through the light emission surface of the unit 310b (the opening part 30f). Another part of the light beam 20a is diffused and reflected at the bottom-plate part 30e, and is then emitted through the light emission surface of the unit 310b (the opening part 30f). A part of the light emitted through the light emission surface of the unit 310b is reflected at the diffusion plate 4 or the first optical sheet 2 provided on an upper part (in the positive Z-axis direction) of the unit 310b, and changes the traveling direction to the negative Z-axis direction. Since an optical path of the light beam 20a is complex, the in-plane luminance distribution of the light beam 20b emitted from the planar light source device 210 is uniformized.

When light having a large divergence angle as with the light beam 20a enters the unit 310b, an amount of light directly reaching the light emission surface of the unit 310b from the light source increases particularly in the vicinity of the light source. In this case, the luminance distribution can be uniformized only for a short distance in a light traveling direction. In other words, it is difficult to uniformize the luminance distribution in a region distanced from the light source.

In Embodiment 2, in order to efficiently uniformize the in-plane luminance distribution by making use of the feature of the light source 10 as the first light source, the light source 10 is disposed so that the optical axis of the light beam 10a is parallel to a direction of the long sides of the rectangular shape of the reflection member 30. Thus, uniformization of the in-plane luminance distribution of the light beam 10a in the direction of the long sides of the rectangular shape is achieved.

Further, in Embodiment 2, in order to efficiently uniformize the in-plane luminance distribution by making use of the feature of the light source 20 as the second light source, the light source 20 is disposed so that the optical axis of the light beam 20a is parallel to a direction of the short sides of the rectangular shape of the reflection member 30. Thus, uniformization of the in-plane luminance distribution of the light beam 20a in the direction of the short sides of the rectangular shape is achieved.

Figure 13:
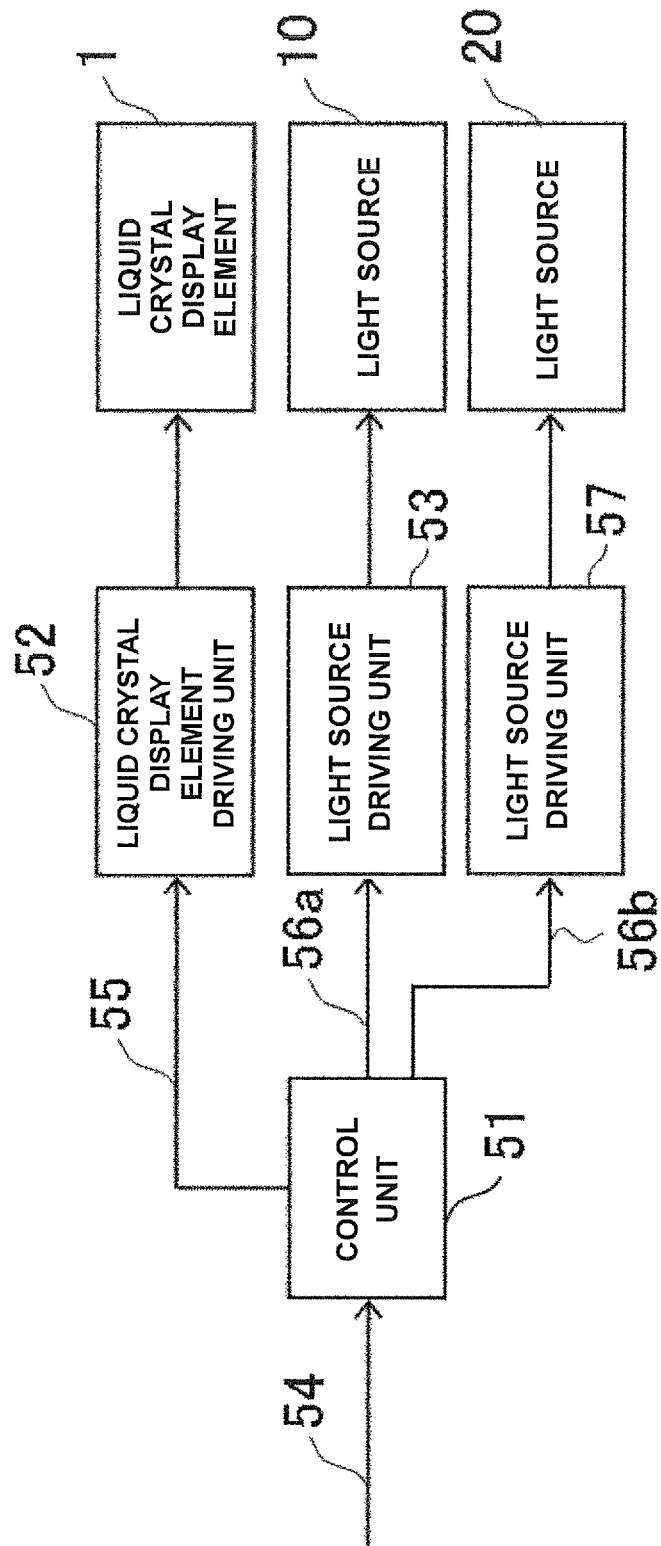
FIG. 13 is a block diagram illustrating a method of driving a liquid crystal display element and light sources of Embodiment 2.

FIG. 13 is a block diagram illustrating a method of driving the liquid crystal display element 1 and the light sources 10 and 20. The control unit 51 receives the video signal 54. The control unit 51 sends the liquid crystal display element control signal 55 to the liquid crystal display element driving unit 52. Further, the control unit 51 sends a light source control signal 56a to the light source driving unit 53. The control unit 51 sends a light source control signal 56b to the light source driving unit 57. As illustrated in FIG. 13, the liquid crystal display element driving unit 52 changes light transmittance of the liquid crystal layer on a pixel to pixel basis in accordance with the control signal (the liquid crystal display element control signal 55) supplied from the control unit 51. Each pixel includes three subpixels. These subpixels include color filters that respectively transmit only red light, green light or blue light. In other words, one pixel includes a subpixel having a color filter transmitting only red light, a subpixel having a color filter transmitting only green light, and a subpixel having a color filter transmitting only blue light.

The liquid crystal display element driving unit 52 produces a color image by controlling the transmittance of each subpixel. Thus, the liquid crystal display element 1 spatially modulates the illumination light 10b emitted from the planar light source device 210 to produce image light. The liquid crystal display element 1 is capable of emitting the image light from the display surface 1a. The term "image light" means light including image information.

In the image display apparatus 110 of Embodiment 2, the light source driving units 53 are individually provided for the respective light sources 10 of the unit 310a or 310b. Further, in the image display apparatus 110, the light source driving units 57 are individually provided for the respective light sources 20 of the unit 310a or 310b. In this regard, ones of the light source driving units 53 and 57, and ones of the light sources 10 and 20 are illustrated in FIG. 13. By individually controlling the light sources 10 and 20 included in the planar light source device 210, lighting of the plurality of units 310a or 310b can be individually controlled. Further, by individually controlling the light sources 10 and 20, luminance of the plurality of units 310a or 310b can be individually adjusted. By individually controlling the light sources 10 and 20, light emission amounts of the respective light sources 10 and 20 can be adjusted in accordance with the respective video signals 54 which are input signals. That is, light emission amounts of the respective light sources 10 and 20 are adjusted in accordance with information on brightness or color at each position in an input image. Therefore, an amount of light in a region illuminated by the unit 300a or 310b can be adjusted in accordance with the input image.

By individually controlling the light sources 10 and 20, the image display apparatus 110 is capable reducing power consumption. Further, by changing lighting positions on the unit 310a or 310b in accordance with driving of the liquid crystal layer of the liquid crystal display element 1, a sense of afterimage which is a problem in liquid crystal display apparatuses can be reduced. In other words, the sense of afterimage can be reduced by selecting the unit 310a or 310b to be lighted.

The planar light source device 200 further includes the light source 20 that emits the light beam 20a having a larger divergence angle than that of the light beam 10a. The light sources 20 are arranged in a direction of the long sides of the bottom-plate part 30e on the inner surfaces of the side-plate parts 30c and 30d connected to the long sides of the bottom-plate part 30e or on the inner surface of the bottom-plate part 30e. The light beam 20a is emitted toward the inside of the box shape of the reflection member, and is emitted through the opening part 30f.

In the above described embodiments, there are cases where terms such as "parallel", "face", "equal intervals" or the like are used to express positional relationships between elements or shapes of the elements. These terms mean including ranges in consideration of manufacturing tolerances, assembly irregularities or the like. The terms "half light", "Lambertian distribution" or the like mean including ranges in consideration of manufacturing irregularities and the like.

Although the embodiments of the present invention are described as above, the present invention is not limited to these embodiments.

EXPLANATION OF REFERENCE CHARACTERS 100, 110 . . . liquid crystal display apparatus, 200, 210 . . . planar light source device, 200a . . . light emission surface, 300, 301, 302, 303 . . . luminance distribution converting device, 300a, 300b, 310a, 310b . . . unit, 1 . . . liquid crystal display element, 1a . . . display surface, 1b . . . back surface, 2 . . . first optical sheet, 3 . . . second optical sheet, 4 . . . diffusion plate, 10 . . . first light source, 10a, 20a . . . light beam, 10b . . . illumination light, 20 . . . second light source, 21 . . . lens, 30 . . . reflection member, 30a, 30b, 30c, 30d . . . side-plate part, 30e . . . bottom-plate part, 30f . . . opening part, 31 . . . hole, 51 . . . control unit, 52 . . . liquid crystal display element driving unit, 53, 57 . . . light source driving unit, 54 . . . video signal, 55 . . . liquid crystal display element control signal, 56 . . . light source control signal.

What is claimed is:

1. A planar light source device comprising:

a first light source that emits a first light beam having directivity;

a reflection member including a single bottom-plate part, an opening part facing the bottom-plate part, and side-plate parts delimiting a space between the bottom-plate part and the opening part so that the space has a columnar shape, wherein the side-plate parts are disposed on positions of respective sides of the bottom-plate part, the bottom-plate part and the side-plate parts having inner surfaces which are reflection surfaces, and a second light source that emits a second light beam having a divergence angle wider than that of the first light beam, wherein the opening part has a quadrilateral shape including two facing short sides and two facing long sides; the quadrilateral shape being formed by the side-plate parts, wherein the first light beam enters an inside of the reflection member through a side of a first side-plate part which is one of the side-plate parts disposed on positions of the short sides of the opening part, travels in a direction of the long sides while being reflected at second side-plate parts which are the side-plate parts disposed on positions of the long sides of the opening part, and is emitted through the opening part;

wherein the reflection surface of the second side-plate part includes a region at which the first light beam is spectrally reflected and a region at which the first light beam is diffused and reflected, such that a density of a diffusion reflection material of the reflection surface of the second side-plate part increases in the traveling direction of the first light beam; and wherein the second light beam enters the inside of the reflection member through a side of the second side-plate part or a side of the bottom-plate part, and is emitted through the opening part.

2. The planar light source device according to claim 1, wherein the reflection surface of the first side-plate part is inclined so as to face the opening part side.

3. The planar light source device according to claim 2, comprising a plurality of the reflection members,
wherein the plurality of the reflection members are arranged in a direction of the short sides so that the first side-plate parts of adjacent reflection members of the plurality of the reflection members are adjacent to each other.

4. The planar light source device according to claim 1, comprising a plurality of the reflection members,
wherein the plurality of the reflection members are arranged in a direction of the short sides so that the first side-plate parts of adjacent reflection members of the plurality of the reflection members are adjacent to each other.

5. The planar light source device according to claim 4, wherein the second light source includes an LED element.

6. The planar light source device according to claim 1, wherein the second light source includes an LED element.

7. A liquid crystal display apparatus comprising:
the planar light source device according to claim 1, and
a liquid crystal display element that receives light emitted by the planar light source device, and emits image light,
wherein the first light source is disposed on a lower end side of the planar light source device.

8. The planar light source device according to claim 1, comprising a plurality of the reflection members,
wherein the plurality of the reflection members are arranged in a direction of the short sides so that the first side-plate parts of adjacent reflection members of the plurality of the reflection members are adjacent to each other.

9. The planar light source device according to claim 8, wherein the second light source includes an LED element.

10. The planar light source device according to claim 1, wherein the second light source includes an LED element.

11. A planar light source device comprising:
a first light source that emits a first light beam;
a reflection member having a single bottom-plate part, an opening part facing the bottom-plate part, and side-plate parts delimiting a space between the bottom-plate part and the opening part so that the space has a columnar shape, wherein the side-plate parts are disposed on positions of respective sides of the bottom-plate part, the bottom-plate part and the side-plate parts having inner surfaces which are reflection surfaces, and wherein the first light source includes a laser element that emits the first light beam;

wherein the opening part has a quadrilateral shape including two facing short sides and two facing long sides, the quadrilateral shape being formed by the side-plate parts;

wherein the first light beam enters an inside of the reflection member through a side of a first side-plate part which is one of the side-plate parts disposed on positions of the short sides of the opening part, travels in a direction of the long sides while being reflected alternately at two second side-plate parts which are the side-plate parts disposed on positions of the long sides of the opening part, and is emitted through the opening part, and wherein the reflection surface of the second side-plate part includes a region at which the first light beam is spectrally reflected and a region at which the first light beam is diffused and reflected, such that a density of a diffusion reflection material of the reflection surface of the second side-plate part increases in the traveling direction of the first light beam.

12. The planar light source device according to claim 11, wherein the reflection surface of the first side-plate part is inclined so as to face the opening part side.

13. The planar light source device according to claim 12, comprising a plurality of the reflection members,
wherein the plurality of the reflection members are arranged in a direction of the short sides so that the first side-plate parts of adjacent reflection members of the plurality of the reflection members are adjacent to each other.

14. The planar light source device according to claim 11, comprising a plurality of the reflection members,
wherein the plurality of the reflection members are arranged in a direction of the short sides so that the first side-plate parts of adjacent reflection members of the plurality of the reflection members are adjacent to each other.

15. A liquid crystal display apparatus comprising:
the planar light source device according to claim 11, and
a liquid crystal display element that receives light emitted by the planar light source device, and emits image light,
wherein the first light source is disposed on a lower end side of the planar light source device.

16. The planar light source device according to claim 11, comprising a plurality of the reflection members,
wherein the plurality of the reflection members are arranged in a direction of the short sides so that the first side-plate parts of adjacent reflection members of the plurality of the reflection members are adjacent to each other.

* * * * *